(12) United States Patent
Takashima et al.

(10) Patent No.: US 7,956,853 B2
(45) Date of Patent: Jun. 7, 2011

(54) APPARATUS OPERATING SYSTEM

(75) Inventors: Ryou Takashima, Toyota (JP); Toru Kurita, Chiryu (JP)

(73) Assignee: Denso Corporation, Kariya (JP)

( * ) Notice: Subject to any disclaimer, the term of this patent is extended or adjusted under 35 U.S.C. 154(b) by 1513 days.

(21) Appl. No.: 11/354,911

(22) Filed: Feb. 16, 2006

(65) Prior Publication Data
US 2006/0190843 A1    Aug. 24, 2006

(30) Foreign Application Priority Data

Feb. 18, 2005  (JP) .................................. 2005-041776
Jan. 17, 2006  (JP) .................................. 2006-009264

(51) Int. Cl.
*G06F 3/033*   (2006.01)
(52) U.S. Cl. ......... 345/184; 345/156; 715/810; 715/817
(58) Field of Classification Search .................. 345/156, 345/184; 341/35; 701/200; 715/700, 834, 715/817, 818, 819, 825, 828, 10, 829, 810
See application file for complete search history.

(56) References Cited

U.S. PATENT DOCUMENTS

| | | | | |
|---|---|---|---|---|
| 5,856,827 A | * | 1/1999 | Sudo | 715/841 |
| 2002/0163543 A1 | * | 11/2002 | Oshikiri | 345/810 |
| 2003/0112279 A1 | * | 6/2003 | Irimajiri | 345/810 |

FOREIGN PATENT DOCUMENTS

| | | |
|---|---|---|
| JP | A-11-305657 | 11/1999 |
| JP | A-2001-36624 | 2/2001 |
| JP | A-2004-271613 | 9/2004 |

* cited by examiner

*Primary Examiner* — Amare Mengistu
*Assistant Examiner* — Koosha Sharifi
(74) *Attorney, Agent, or Firm* — Posz Law Group, PLC

(57) ABSTRACT

An apparatus operating system includes a display unit and an input operation apparatus. The display unit displays an electronic map and an operation menu included in a multi-layer hierarchical structure. The input operation apparatus is a rotary switch or joy-stick enabled to input an operation direction or operation amount. When the input operation apparatus is operated with no operation menu displayed, the display unit displays a specific operation menu previously associated with the inputted operation direction or operation amount.

15 Claims, 18 Drawing Sheets

STEERING WHEEL ANGLE

| INPUT DIRECTION | | 0°−29° | 61°−119° | 151°−209° | 241°−299° |
|---|---|---|---|---|---|
| | 27U | M1 | M4 | M3 | M2 |
| | 27R | M2 | M1 | M4 | M3 |
| | 27D | M3 | M2 | M1 | M4 |
| | 27L | M4 | M3 | M2 | M1 |

↑ ROW 1   ↑ ROW 2   ↑ ROW 3   ↑ ROW 4

APPARATUS OPERATING SYSTEM

CROSS REFERENCE TO RELATED APPLICATIONS

This application is based on and incorporates herein by reference Japanese Patent Applications No. 2005-41776 filed on Feb. 18, 2005, and No. 2006-9264 filed on Jan. 17, 2006.

FIELD OF THE INVENTION

The present invention relates to an apparatus operating system used for operating an apparatus.

BACKGROUND OF THE INVENTION

A navigation apparatus in a vehicle contributes to effective and safe driving of a user with the following process: detecting a current position using GPS (Global Positioning System) during the driving; displaying the detected current position on a display apparatus; designating an optimum route from the current position to a destination; and navigating along the optimum route using the display apparatus or sound output apparatus.

A method of inputting a destination to designate a route includes an address input where a prefecture, a city, and a house number are hierarchically selected; a genre input where a genre such as a tourist resort, an amusement part, or a public facility is selected and an individual point is then selected; and a surrounding facility search where one of facilities surrounding a destination is selected and an individual point is then selected. These input methods are displayed in a menu as a list for a user to select an intended operation item.

In the navigation apparatus, a method of displaying a map can be also selected. The method includes a mode where an advancing direction is always upside; a mode where the north is always upside, and a mode where a three-dimensional map is displayed. These modes or methods are also displayed in a menu as a list for a user to select an intended mode.

To select an intended operation item or the like, the following is operated in an order.

(i) Call up a list of menus (highest layer MA) (FIG. 21A to FIG. 21B)

(ii) Select an intended menu (FIG. 21B to FIG. 21C)

(iii) Select an intended operation item form the menu to execute

As shown in FIG. 21B, each menu is hierarchically stored under the highest-layer menu MA, which is needed to be called up each time an operation item is executed. It is preferred that an intended menu is directly called up or selected without the highest-layer menu MA called up.

A navigation apparatus recently uses an input operation apparatus (or input manipulation apparatus) such as a rotary switch or joy-stick, which is capable of inputting an operation direction or an operation amount, in addition to an input operation apparatus with pressing or touching type such as a switch or touch panel. Patent Document 1 describes a navigation apparatus using a rotary switch: rotating the rotary switch causes a map or menu to be scrolled. Patent Document 2 describes a navigation apparatus using a multi-directional switch (joy-stick).

An input operation apparatus such as a rotary switch or joy-stick allows an input with rotating operation, or tilting operation, which provides user-friendliness. An easy-to-use navigation apparatus has been developed by adopting a rotary switch or joy-stick. Furthermore, not limited to a navigation apparatus, a rotary switch or joy-stick has been preferably used for a handheld terminal, an electric appliance, a personal computer, etc.

Patent Document 1: JP-H11-305657 A

Patent Document 2: JP-2004-271613 A

SUMMARY OF THE INVENTION

It is an object of the present invention to provide an apparatus operating system that uses an input operation apparatus capable of inputting an operation direction or an operation amount to provide user-friendliness. In particular, when an intended operation menu layered under a higher-layer menu is called up, the higher-layer menu can be bypassed to eliminate one procedure for calling up the intended operation menu.

To achieve the above object, an apparatus operating system is provided with the following: An operation menu storage unit is included for storing a plurality of operation menus, each operation menu including a plurality of operation items as a list to operate a given apparatus; a display unit is included for displaying each operation menu; an input operation apparatus is included to be enabled to input at least one of an operation direction and an operation amount. Furthermore, when a first operation is applied to the input operation apparatus with no operation menu displayed, one of the operation menus that is previously associated with the first operation is displayed by the display unit. In contrast, when a second operation is applied to the input operation apparatus with one of the operation menus displayed, an intended operation item included in the one of the operation menus is selectable based on the second operation.

Under the above structure, when the input operation apparatus is operated in a certain operation direction or operation amount while the display unit displays no operation menu, an intended operation item included in an operation menu that is associated with the certain operation direction or operation amount can be directly displayed. Furthermore, when the input operation apparatus is operated while the display unit displays an operation menu, an intended operation item included in the displayed operation menu can be selectable based on an operation applied to the input operation apparatus. This allows the input operation apparatus to call up an operation menu and then select an operation item included in the operation menu called up in order. This enhances the user-friendliness of the apparatus operating system.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An apparatus operating system according to an embodiment of the present invention will be explained using a navigation apparatus with reference to drawings.

Figure 1:
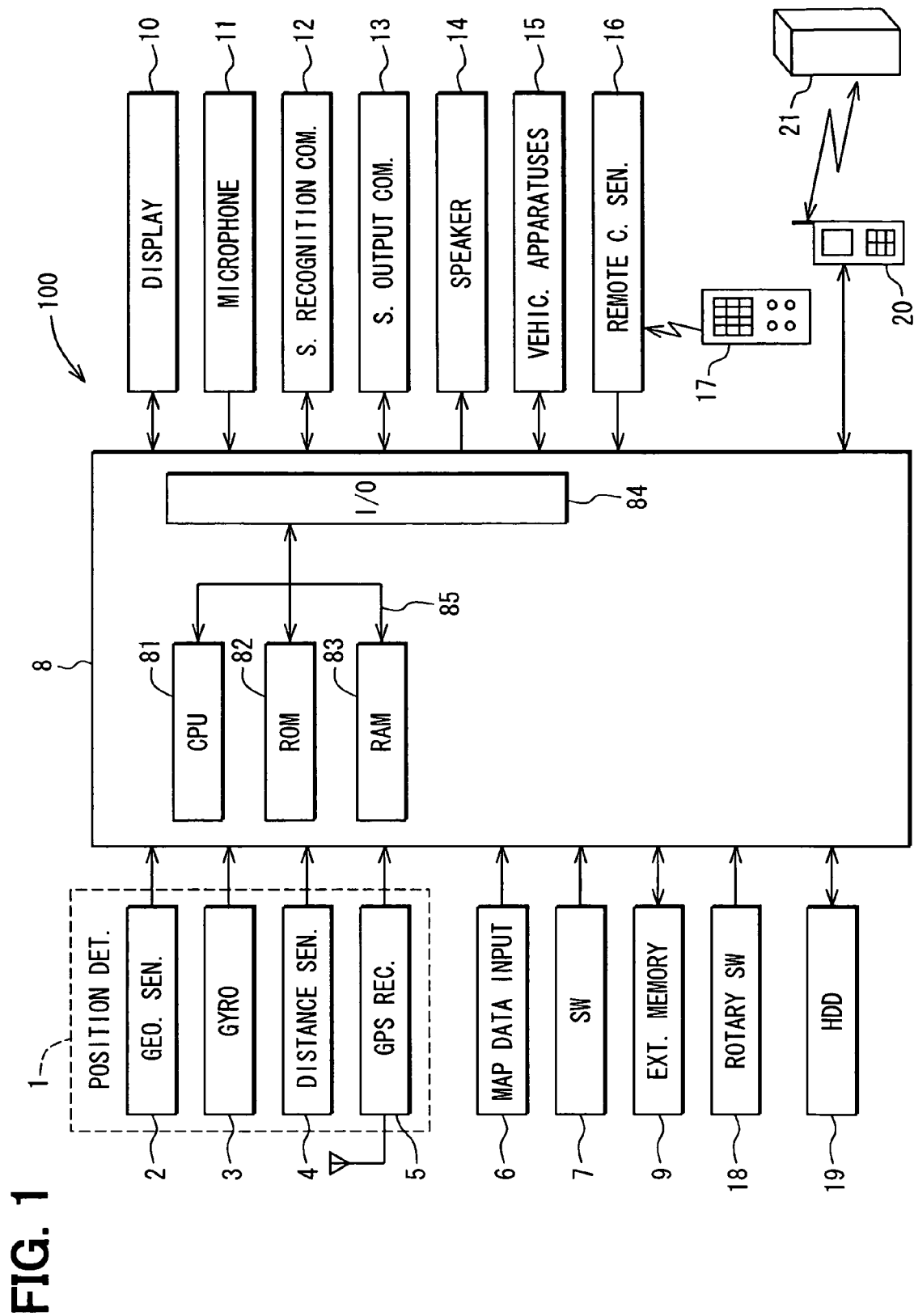
FIG. 1 is a block diagram of a schematic structure of a navigation apparatus according to an embodiment of the present invention.

As shown in FIG. 1, a navigation apparatus 100 in a vehicle includes a position detector 1, a map data input unit 6, an operation switch group 7, a control circuit 8 connected with the foregoing, an external memory 9, a display apparatus 10 as a display unit, a sound input apparatus (or microphone) 11, a sound recognition control unit 12, a sound output control unit 13, a sound output apparatus (or speaker) 14, a vehicular apparatuses 15, a remote control sensor 16, a rotary switch 18 as an input operation apparatus, and a HDD 19 (Hard Disk Drive).

The position detector 1 includes a known geomagnetic sensor 2, gyroscope 3, distance sensor 4, and GPS receiver 5 for detecting a current position of the vehicle based on radio waves from satellites. These sensors or the like 2, 3, 4, 5 have individual different types of errors and are used while being complemented by each other. The position detector 1 can be constructed to include only part of the above sensors 2 to 5 depending on accuracy requirement. A steering rotation sensor or a wheel sensor of a following wheel can be included.

The map data input unit 6 is used for inputting map matching data to increase position detection accuracy. A storage medium for the map data is typically a CD-ROM or DVD based on a data volume; furthermore, a memory card can be used.

The rotary switch 18 converts a rotation direction or a rotation angle due to a rotation operation to an electric signal to transmit to the control circuit 8. In addition to the rotary switch 18, an operation switch group 7 is provided. The switch group 7 can be touch switches or mechanical switches integrated with the display apparatus 10. The touch switches are formed of infrared sensors arranged in minute detail lengthwise and breadthwise on a screen of the display apparatus 10. When a finger or pen interrupts infrared at a certain point, this certain point is detected as a two-dimensional coordinates (X,Y). A pointing device such as mouse or cursor can be used. Various instructions can be inputted by using the above operation switch group 7, rotary switch 18, or a remote controller 17.

The sound recognition control unit 12 can be also used for inputting instructions. A sound or speech inputted via the microphone 11 is converted to a sound signal; then, the sound signal is subjected to a known sound recognition technology to be converted to an operation command corresponding to a result.

The control circuit 8 is a typical computer to include a known CPU 81 (functioning as an active state determining unit, specific operation menu calling unit, replacement displaying unit, normal operation controlling unit, and direct operation executing unit); a ROM 82, a RAM 83 (functioning as an operation menu storage unit), an I/O 84 being an input/output circuit, and a bus line connected with the foregoing components. The CPU 81 performs overall control using data and a navigation program 19p stored in the HDD 19. Reading/writing control for the HDD 19 is performed by the CPU 81.

The HDD 19 can store map data, auxiliary data for navigation, entertainment data, and data for a user to input. The data can be updated through manipulating or operating of the operation switch group 7 or remote controller 17, or via voice input. Furthermore, map data or the like can be also updated from the map data input unit 6.

The external memory 9 is a rewritable semiconductor device such as a RAM, or flash memory to store data necessary for a process of the navigation apparatus 100. The external memory 9 can hold data with an accessory switch turned off (or with the navigation apparatus 100 turned off).

The data necessary for navigation can be stored in the HDD 19 instead of the external memory 9, or divided and separately stored in both the HDD 19 and the external memory 9. An access speed to the external memory 9 is faster than that to the HDD 19: data more frequently read/written should be stored in the external memory 9 while data less frequently read/written should be stored in the HDD 19. Data stored in the external memory 9 can be backed up in the HDD 19.

The navigation apparatus 100 can communicate with an external network 21 using a handheld terminal such as a cellular phone 20 to connect to the Internet or a dedicated information center. Telephone call without holding the cellular phone 20 can be possible by using the sound input apparatus 11 and sound output apparatus 14.

The display apparatus 10 is a color liquid crystal display unit to display a mark of the detected current position, map data, and additional data such as guidance route on a screen, all of which are overlapped with each other.

Under the above structure, the CPU 81 of the control circuit 8 starts the navigation program 19p; a driver operates the operation switch group 7 or remote controller 17 or performs a voice input via the sound input apparatus 11; the display apparatus 10 is caused to display an operation menu; and an intended process can be eventually selected from the operation menu to execute.

Figure 2A:
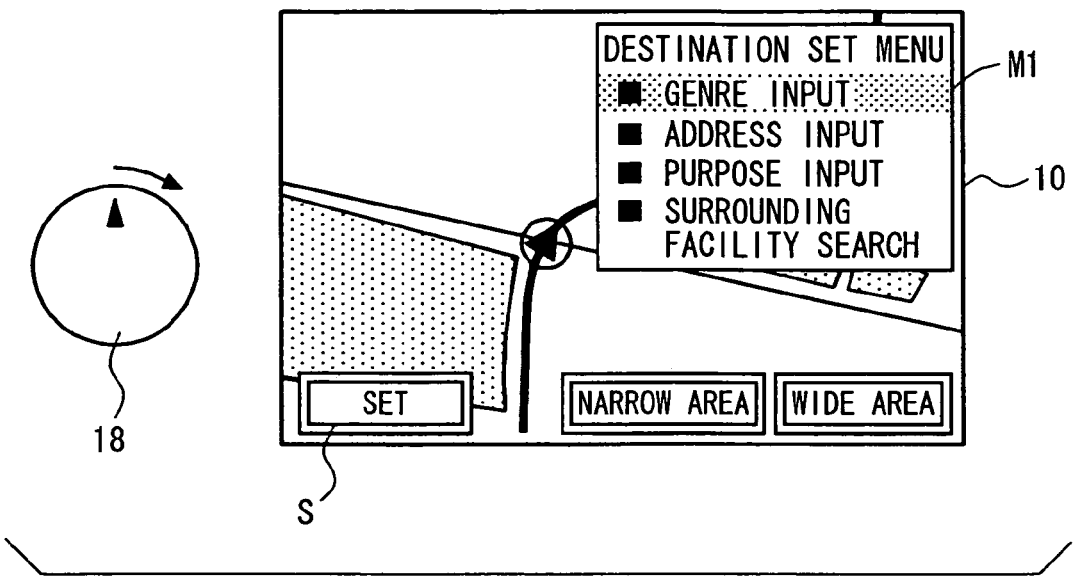
FIGS. 2A, 2B are examples of displaying different operation menus depending on rotation directions of a rotary switch.
Figure 2B:
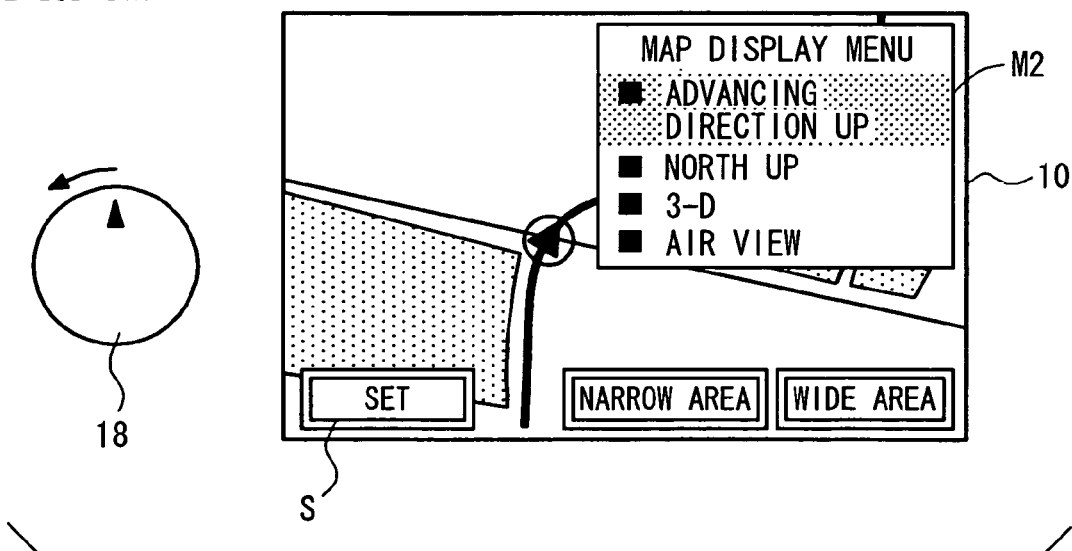
Figure 3A:
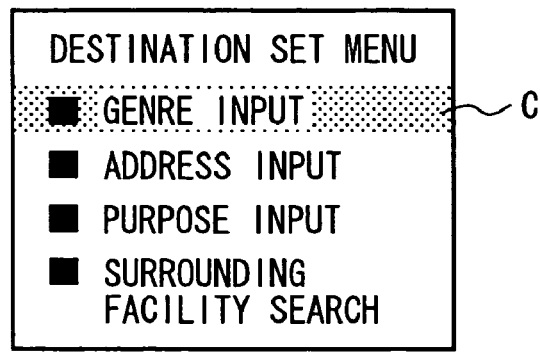
FIGS. 3A to 3D are diagrams illustrating replacement of a cursor in accordance with rotation of a rotary switch.
Figure 3B:
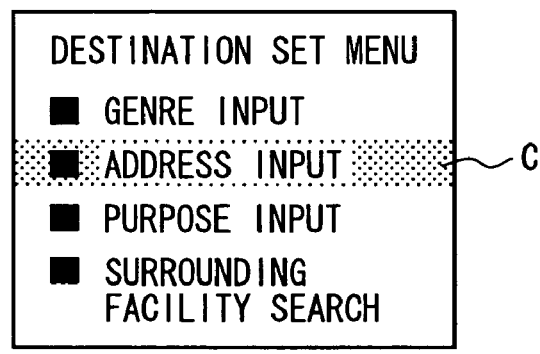
Figure 3C:
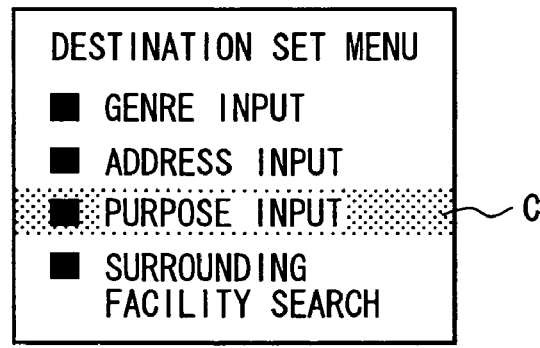
Figure 3D:
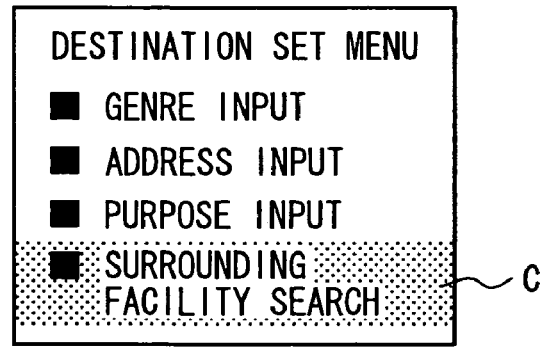
Figure 21A:
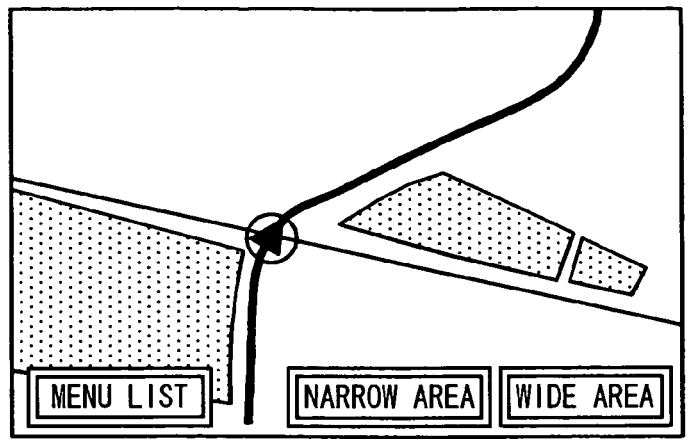
FIGS. 21A to 21C are diagrams illustrating an operational procedure of a navigation apparatus in a related art.
Figure 21B:
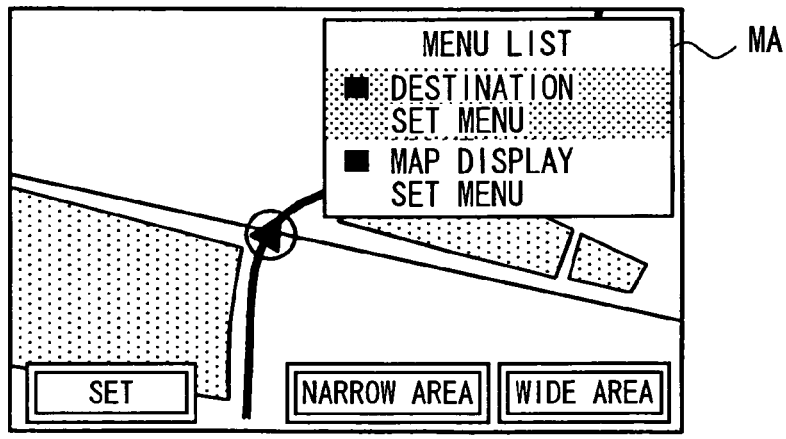
Figure 21C:
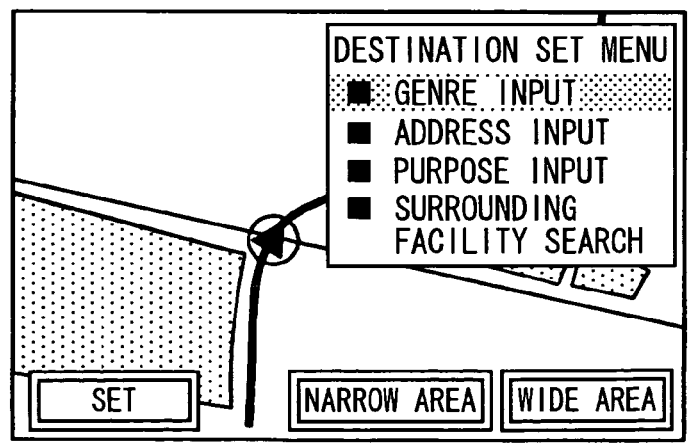

An intended operation menu can be directly called up by using an operation direction (or rotation direction) and an operation amount (or rotation angle) of the rotary switch 18. As shown in FIGS. 2A, 2B, right-handed rotation of the rotary switch 18 causes a destination set menu M1 to be displayed; left-handed rotation causes a map display menu M2 to be displayed, respectively. Thus, an intended operation menu can be directly displayed depending on a rotation direction of the rotary switch 18. This can eliminate a procedure for displaying a list of menus MA in FIG. 21B, enhancing user-friendliness.

In contrast, right-handed rotation of the rotary switch 18 can be designed to cause a map display menu M2 to be displayed; left-handed rotation can be designed to cause a destination set menu M1 to be displayed, respectively.

Furthermore, after the operation menu is displayed, further rotating the rotary switch 18 can cause a cursor C to be replaced to any one of operation items included in the operation menu. Thus, both of (i) selecting and calling up one of the operation menus M1, M2 and (ii) then selecting one of operation items in the selected operation menu M1, M2 can be serially performed only by rotation operation of the rotary switch 18. Then the user selects an intended operation item from the selected operation menu M1, M2 to execute.

Figure 4:
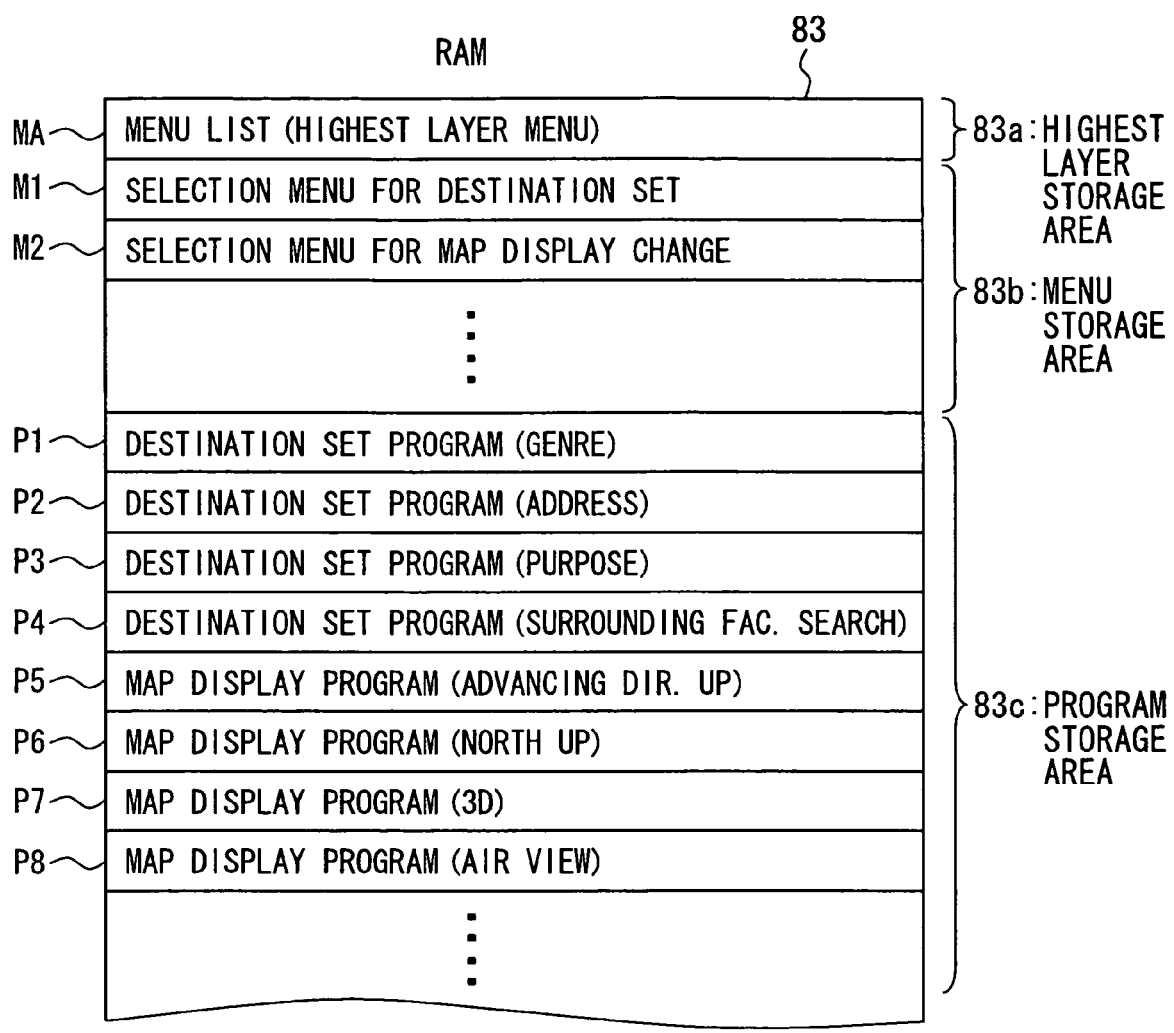
FIG. 4 is a diagram illustrating a storage area of a RAM.

Next, a storage area will be explained below. A storage area of the RAM 83 is shown in FIG. 4. The RAM 83 includes a highest-layer menu storage area 83a; a menu storage area 83b for storing the operation menus M1, M2; and a program storage area 83c for storing programs P1 to P8 for executing each operation item displayed in the operation menus M1, M2. The operation menus M1, M2 and programs P1 to P8 are initially stored in the HDD 19 as part of the navigation program 19p and then stored in the RAM 83 when the navigation program 19p is started. In this embodiment, the menu list (highest-layer menu) MA can be initially displayed using the operation switch group 7; then, an operation menu can be selected from the displayed menu list MA and displayed. Alternatively, an operation menu can be directly selected and displayed with the menu list MA bypassed (or not displayed) using the rotary switch 18. In this embodiment, the RAM 83 is used as the operation menu storage unit; however, the ROM 82, HDD 19, or external memory 9 can be alternatively used.

Figure 5:
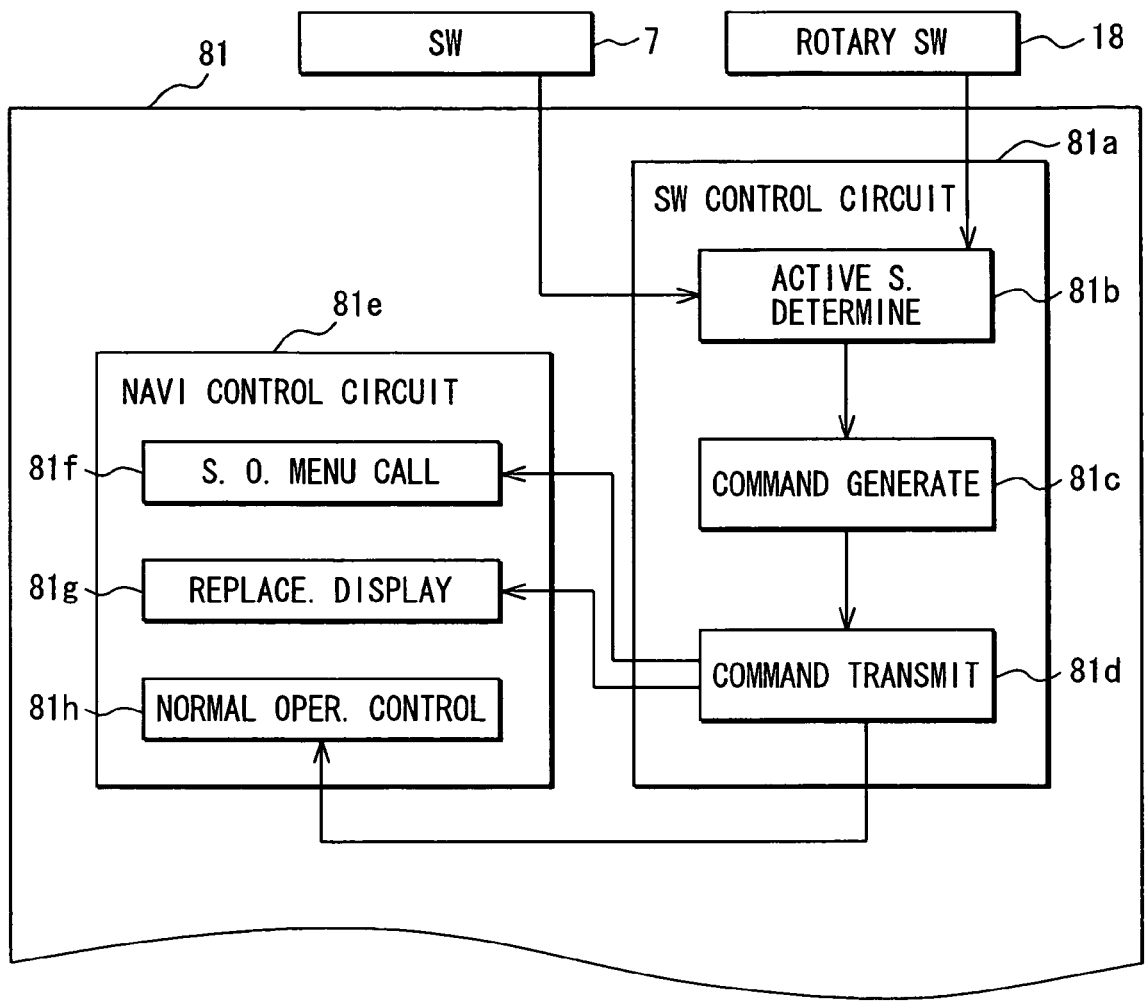
FIG. 5 is a block diagram of a CPU.

As shown in FIG. 5, the CPU 81 includes a switch control circuit 81a and a navigation control circuit 81e. The switch control circuit 81a includes an active state determining unit 81b, a command generating unit 81c, and a command transmitting unit 81d. The navigation control circuit 81e includes a specific operation menu calling unit 81f, a replacement displaying unit 81g, and a normal operation controlling unit 81h.

The active state determining unit 81b determines either an active state where an operation menu is displayed on the display apparatus 10 or a non-active state where no operation menu is displayed. The command generating unit 81c generates a predetermined command based on a determination result of the active state or non-active state and an operation of the rotary switch 18, to transmit the generated command to the command transmitting unit 81d.

When the display apparatus 10 is in a non-active state, the command transmitting unit transmits the command to the specific operation menu calling unit 81f in the navigation control circuit 81e. The specific operation menu calling unit 81f then determines an exceptional procedure in a menu calling mode and causes a specific operation menu to be displayed: the specific operation menu is one of the operation menus stored in the RAM 83 and previously associated with at least one of a rotation direction and an operation amount of the rotary switch 18.

In contrast, when the display apparatus 10 is in an active state, a command generated by the command generating unit 81c is consequently transmitted to the replacement displaying unit 81g. The replacement displaying unit 81g executes a replacement display (or replaces the cursor C or scroll the operation menu M1, M2) for the user to select one of the operation items in the operation menu M1, M2. When the user requires execution by selecting one of the operation items through operating the operation switch group 7 (e.g., pressing a set button S in FIGS. 2A, 2B), the command from the command generating unit 81c is transmitted to the normal operation controlling unit 81h. The normal operation controlling unit 81h then determines a normal procedure in a normal operation mode to call up a program P1 to P8 corresponding to the selected operation item from the RAM 83 to execute.

Figure 6:
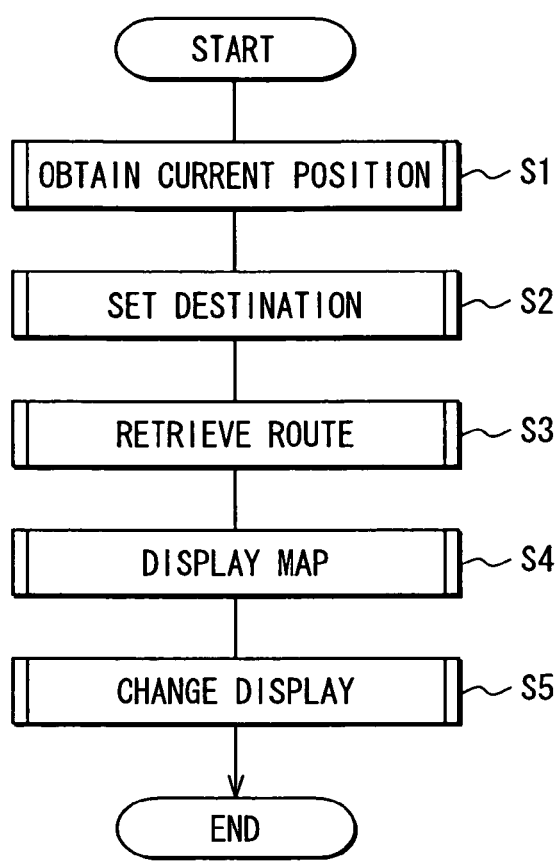
FIG. 6 is a flowchart diagram illustrating an overall process of the navigation apparatus.

A flowchart of a process executed by the navigation apparatus 100 is shown in FIG. 6. The navigation apparatus 100 executes the following: computing a current position of the vehicle based on data from the satellites via the GPS receiver 5 (Step S1); designating a destination by a user (Step S2); computing an optimum route to the destination from the current position, e.g., by using the known Dijkstra method (Step S3); superimposing the optimum route on a map displayed on the display apparatus 10 to navigate to the user along the route by providing operation guidance or a message based on an operating state using at least one of the display apparatus 10 or sound output apparatus 13 (Step S4); and, furthermore, changing a map display method by the user as needed (Step S5).

Figure 7:
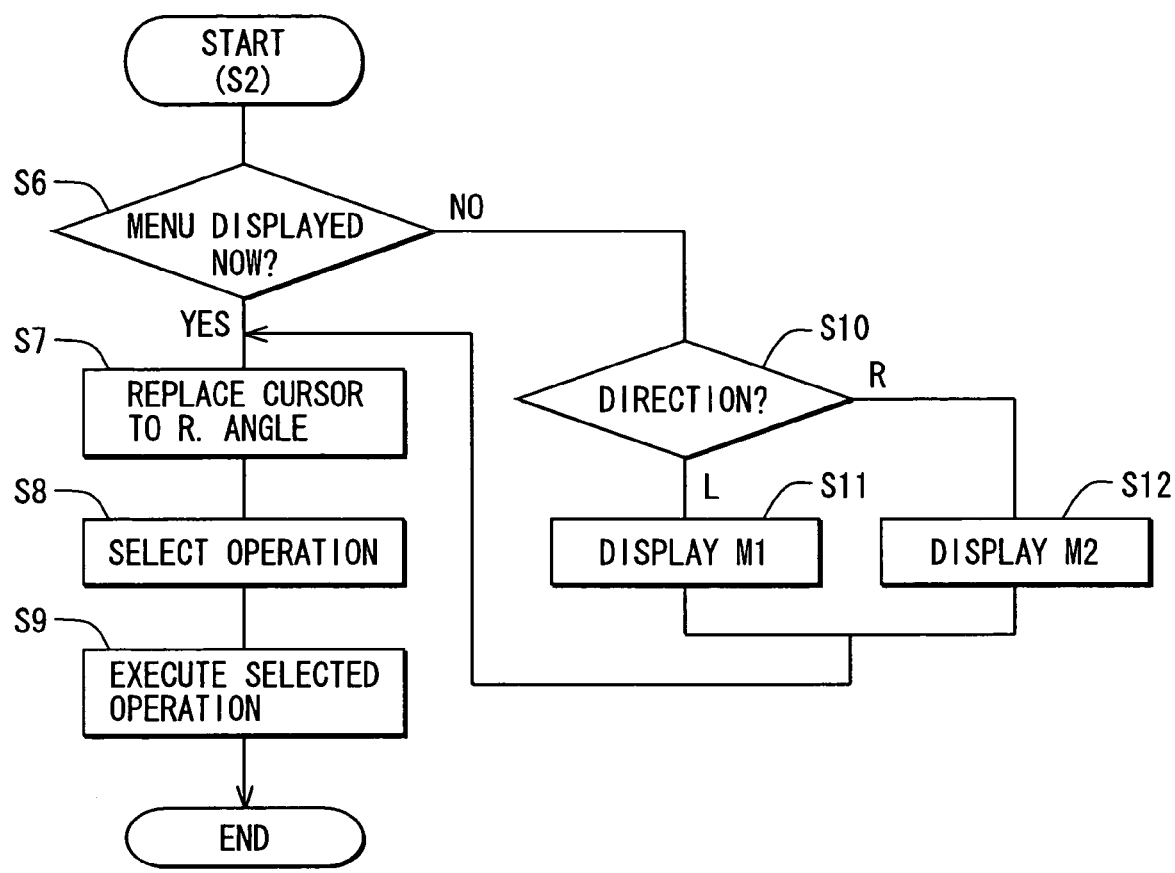
FIG. 7 is a flowchart diagram illustrating a process for designating a destination.

Designating a destination at Step S2 is executed based on a flowchart in FIG. 7. When the rotary switch 18 is rotated while the display apparatus 10 is in an active state where one of the operation menus M1, M2 is displayed, determination at Step S6 is affirmed and Step S7 is performed. This determination is executed by the active state determining unit 81b. At Step S7, the cursor C is replaced according to a rotation angle of the rotary switch 18 as shown in FIGS. 3A to 3D. This replacement is executed by the replacement displaying unit 81g. When the user then selects an intended operation item at Step S8, the normal operation controlling unit 81h executes, at Step S9, a program stored in the RAM 83 corresponding to the selected operation item.

In contrast, when the rotary switch 18 is rotated while the display apparatus 10 is in a non-active state where no operation menu M1, M2 is displayed, determination at Step S6 is negated and Step S10 is performed. The specific operation menu calling unit 81f displays one of the operation menus M1, M2 associated with a rotation direction of the rotary switch 18 (Step S11 or S12). In this embodiment, the right-handed rotation corresponds to a map display set menu M2 Step S12); the left-handed to a destination set menu M1 (Step S1). When the rotary switch 18 is further rotated (or as a rotation angle is increased), Step S7 is performed to replace the cursor C. Then Steps S8, S9 are performed to select an operation item to execute.

Figure 8A:
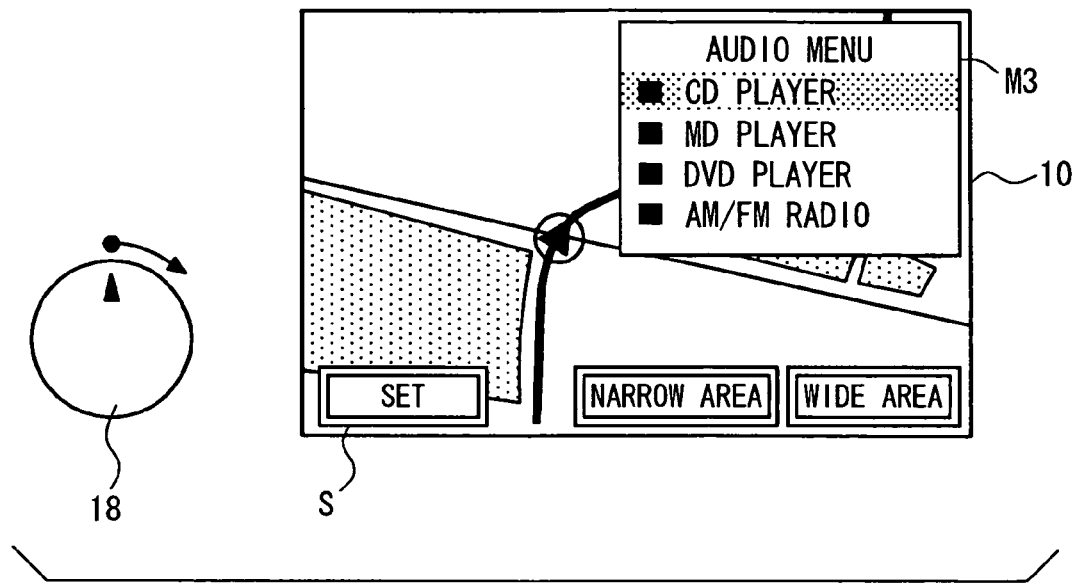
FIGS. 8A, 8B are examples of displaying different operation menus depending on rotation angles of a rotary switch.
Figure 8B:
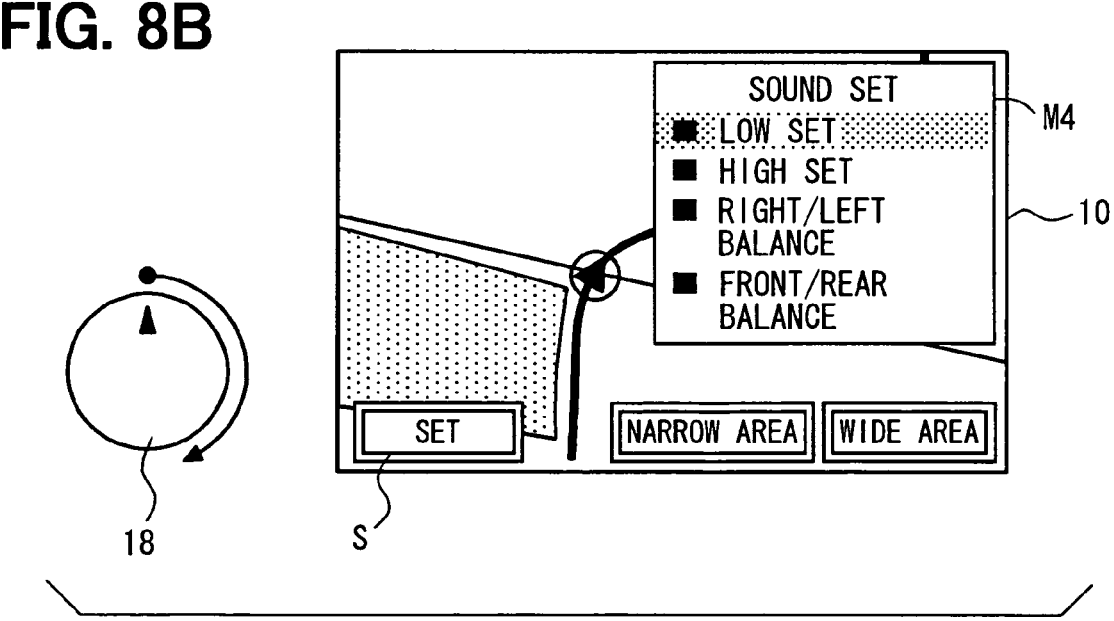

An example of this embodiment is shown in FIG. 8. This example allows a display of an operation menu previously associated with an operation amount (large amount or small amount) of the rotary switch 18. The small rotation angle (less than 120 degrees) or large rotation angle (not less than 120 degrees) corresponds to displaying an operation menu M3 (FIG. 8A) or M4 (FIG. 8B), respectively. An audio menu M3 is used for selecting one of in-vehicle audio apparatuses (CD, MD, DVD, and radio set). A sound set menu M4 is used for setting a sound in the selected audio apparatus. This structure allows operation of in-vehicle apparatus other than the navigation apparatus 100. In this example, it can be alternatively so designed that the small rotation angle (less than 120 degrees) or large rotation angle (not less than 120 degrees) corresponds to displaying an operation menu M4 (FIG. 8B) or M3 (FIG. 8A), respectively.

These operation menus M3, M4 and other programs for setting a sound are stored in the RAM 83, ROM 82, or external memory 9. When a user selects an intended operation item from one of the operation menus M3, M4, a program corresponding to the selected operation item is executed by the normal operation controlling unit 81h.

Another operation menu other than the operation menus M3, M4 can be displayed. A menu more frequently used can correspond to the small angle operation, while a menu less frequently used can correspond to the large angle operation. Furthermore, detection patterns for the rotation angles can be increased to three or more patterns, instead of only two patterns.

Furthermore, this example can include a reset function for deleting the displayed operation menu M3, M4 when the rotary switch is rotated in an opposite direction or left-handed direction.

Figure 9:
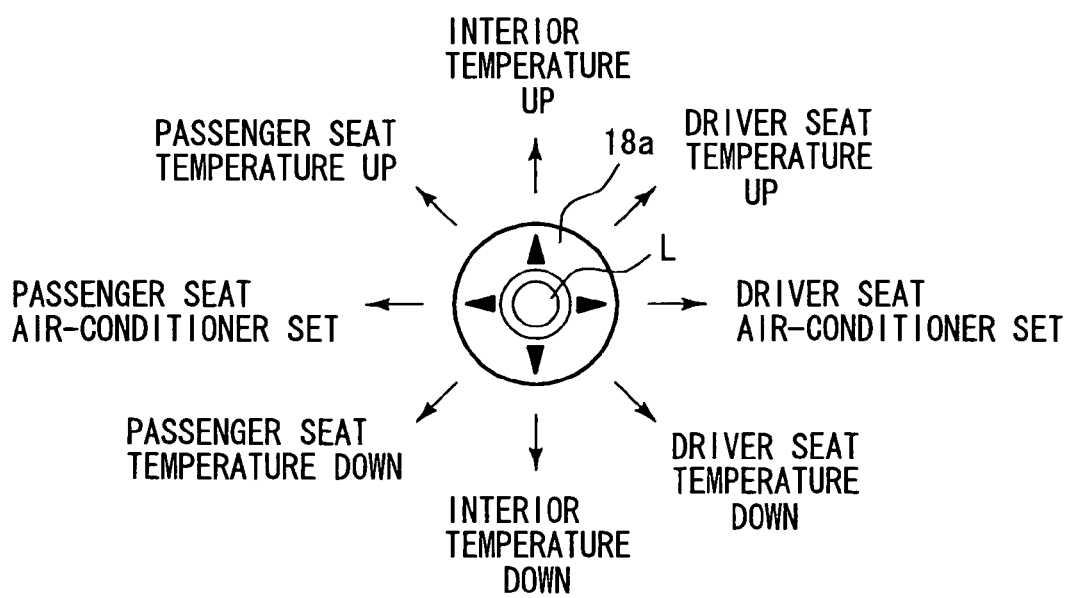
FIG. 9 is a diagram illustrating an embodiment using a joy-stick.

An example that adopts a joy-stick 18a will be explained with reference to FIGS. 9 to 12. As shown in FIG. 9, the joy-stick 18a has an operation lever L universally tilted and direction sensors (not shown) for detecting input directions to which the lever L is tilted. The direction sensors (e.g., eight sensors) are provided to surround the operation lever L within the joy-stick 18a. An electric voltage is allied to the direction sensors. When the operation level L is tilted, one of the direction sensors is turned on to output the corresponding direction as an electric signal. A user can perform an intended operation item or cause the display apparatus 10 to display an operation menu by using the joy-stick 18a.

In FIG. 9, the joy-stick 18a is used for operating an in-vehicle air-conditioner. Tiling the operation lever L to right corresponds to displaying a set menu for an air-conditioner facing a driver seat; tilting to left corresponds to displaying a set menu for an air-conditioner facing a passenger seat. Furthermore, a set temperature in a vehicle interior can be increased or decreased by tiling upward or downward; a set temperature in a driver seat can be increased or decreased by tilting right upward or right downward; and a set temperature for a passenger seat can be increased or decreased by tilting left upward or left downward, respectively.

Figure 10:
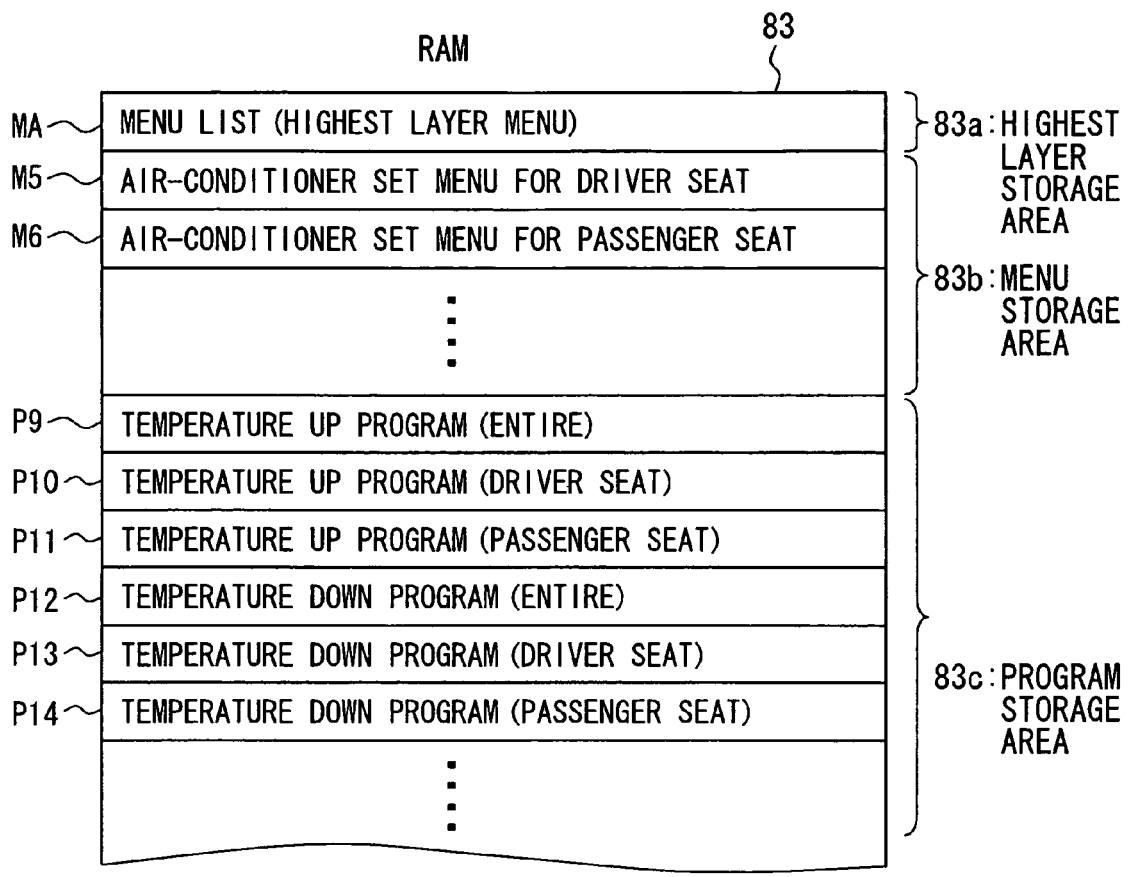
FIG. 10 is a diagram illustrating a storage area of a RAM in operating an in-vehicle air-conditioner.

A storage area of the RAM 83 is shown in FIG. 10. The RAM 83 includes a highest-layer menu storage area 83a for a list MA of the menus M5, M6; a menu storage area 83b for storing the air-conditioner set menus for a driver seat and passenger seat M5, M6; and a program storage area 83c for storing programs P9 to P14 for operating an air-conditioner. In this example, the above menus and programs are stored in the RAM 83; however, they can be alternatively stored in the external memory 9 or ROM 82.

Figure 11:
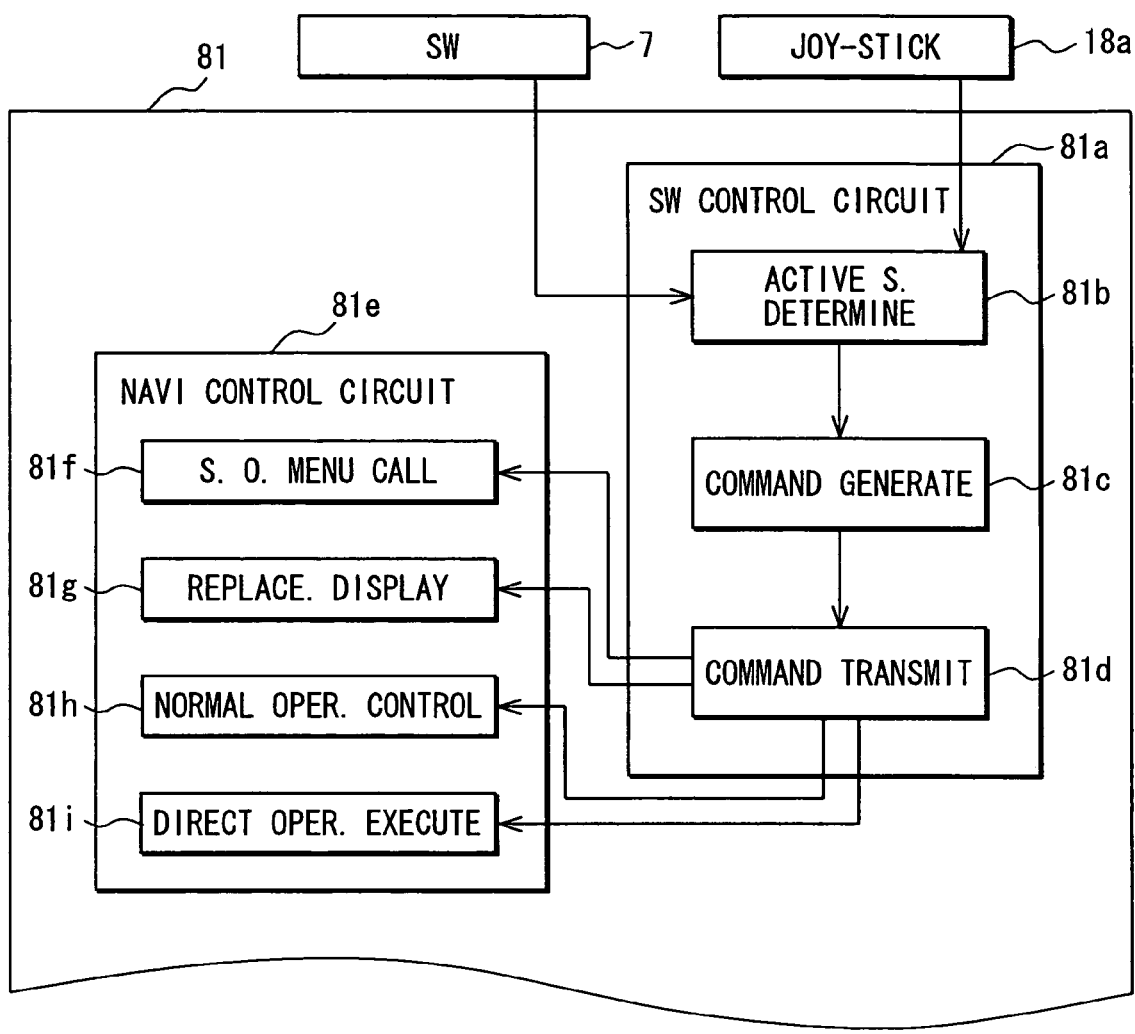
FIG. 11 is a block diagram of a CPU including a direct operation executing unit.

A part of a block diagram of the CPU 81 is shown in FIG. 11. The CPU 81 includes a direct operation executing unit 81i. When a direction is inputted through tilting operation of the joy-stick 18a, the command generating unit 81c transmits a command to the specific operation menu calling unit 81f or the direct operation executing unit 81i depending on the inputted direction. When the joy-stick is tilted to a first direction previously associated with one of the operation menus M5, M6, one of the operation menus M5, M6 is displayed. When the joy-stick is tilted to a second direction previously associated with one of the programs P9 to P14, one of the programs P9 to P14 is called up and directly executed with no operation menu displayed.

Figure 12:
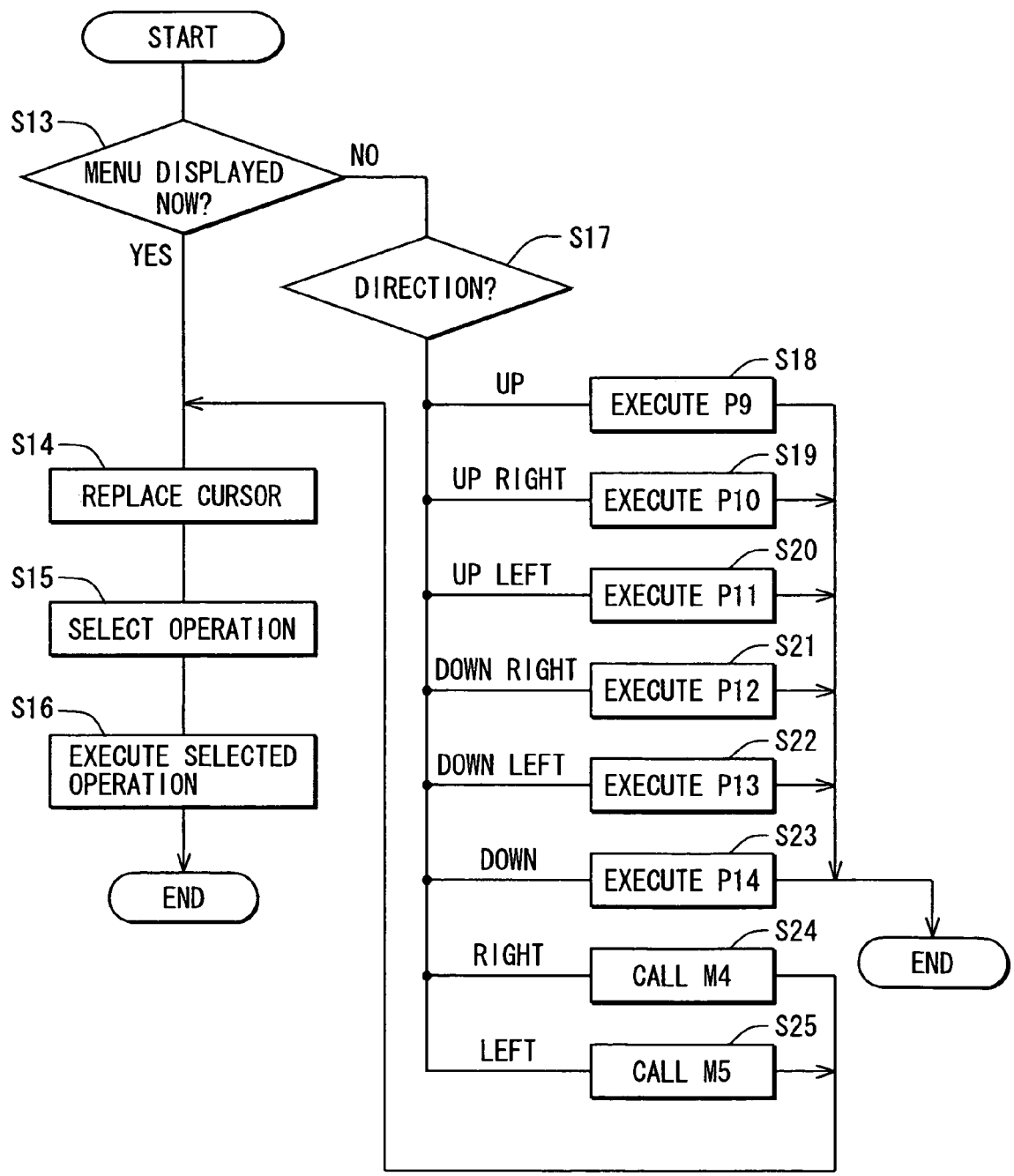
FIG. 12 is a flowchart diagram illustrating a process using a joy-stick.

Next, a flowchart of this example is shown in FIG. 12. When the joy-stick 18a is tilted while the display apparatus 10 displays an operation menu, the active state determining unit 81b makes affirmative determination at Step S13, and Step 14 is performed. At Step S14, the replacement displaying unit 81g replaces a cursor C to a tilt direction (e.g., vertically) to which the joy-stick 18a is tilted. When a user selects an intended operation item from the operation menu (Step S15), the normal operation controlling unit 81h reads out a program corresponding to the intended operation item from the RAM 83 to execute.

In contrast, when the joy-stick 18a is tilted while the display apparatus 10 displays no operation menu, the active state determining unit 81b makes negative determination at Step S13, and Step S17 is then performed. At Step S17, the command transmitting unit 81d changes a recipient of the command depending on the tilt direction. When a program is directly executed (e.g., when a tilt direction is up in FIG. 9), the command is transmitted to the direct operation executing unit 81i (Steps S18 to S23) and the corresponding program is executed. When an operation menu is called up (e.g., when a tilt direction is right or left), the command is transmitted to the specific operation menu calling unit 81f (Steps S24, S25) and the corresponding operation menu is called up and displayed. Furthermore, a displayed cursor C is replaced, an operation item is selected, and the selected operation item is executed (Steps S14 to S16).

Another example of this embodiment is shown in FIG. 13. In this example, a jog-dial 27 as an input operation apparatus is attached to a steering wheel 22. The jog-dial 27 includes a direction input button 23. A user can input four directions (up, down, right, left) by pressing a corresponding peripheral portion of the direction input button 23 using a finger. The four directions (up, right, down, left) are associated with operation menus M1, M2, M3, M4, respectively. For instance, when an up direction is inputted, an operation menu M1 is displayed.

The steering wheel 22 includes a ring portion 22a, a boss (not shown) at the center, and spoke portion 22b connecting the foregoing. The jog-dial 27 is attached to the spoke portion 22b; it can be alternatively attached to the ring portion 22a.

Figure 13A:
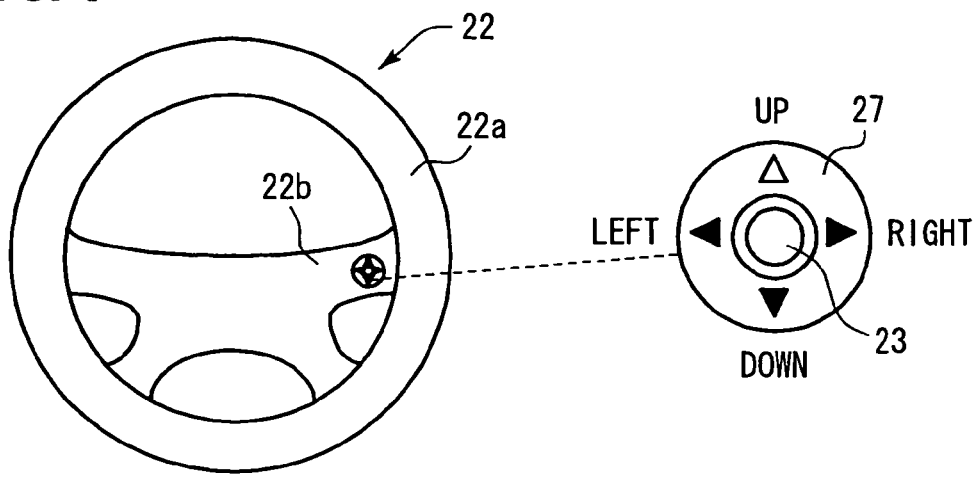
FIGS. 13A to 13C are views illustrating a relationship of a steering wheel angle and a jog-dial.
Figure 13B:
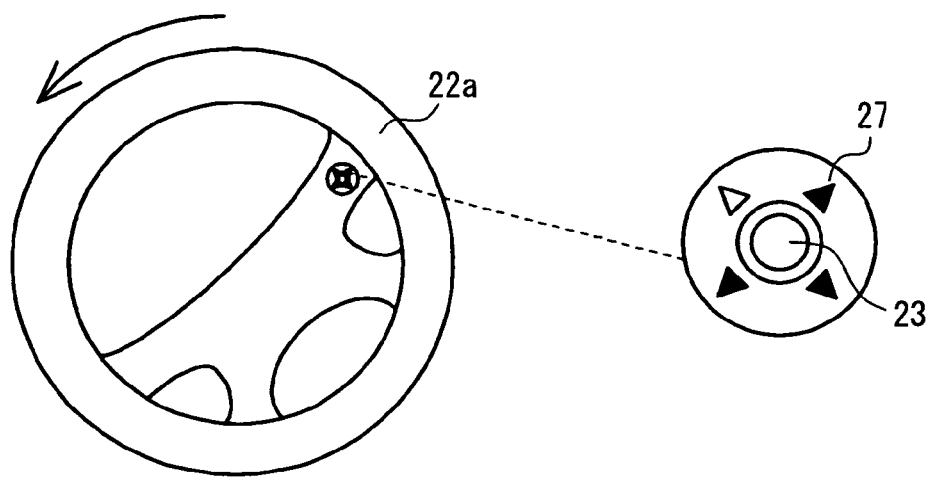
Figure 13C:
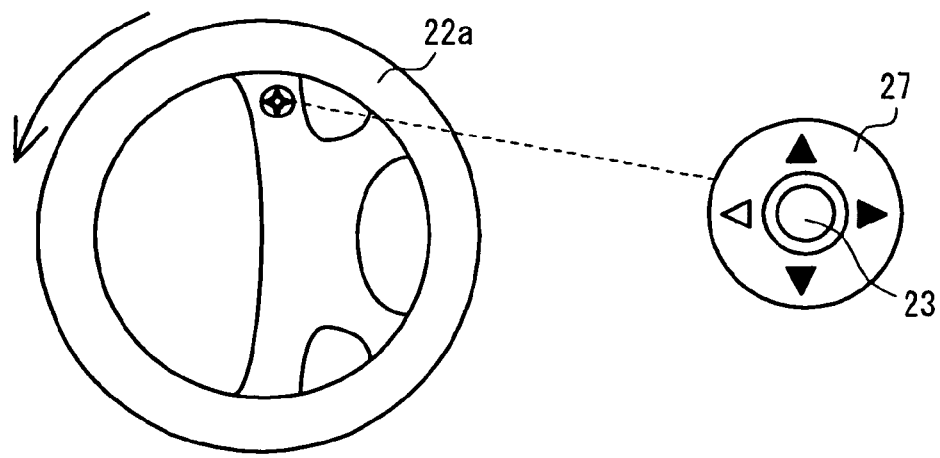

As shown in FIGS. 13A to 13C, when the steering wheel 22 is rotated, the directions of up, down, right, and left of the jog-dial 27 are differently viewed from the driver. When a steering wheel angle is 0 degree as shown in FIG. 13A, inputting of an up direction causes the operation menu M1 to be displayed. If the steering wheel 22 is rotated as shown in FIG. 13C, inputting a left direction is required to cause the operation menu M1 to be displayed. Therefore, in this example, an input direction amending unit 26 is adopted to amend to maintain a relationship of an operation menu and an input direction observed from user's viewpoint, regardless of a steering wheel angle.

Figures 14, 15:
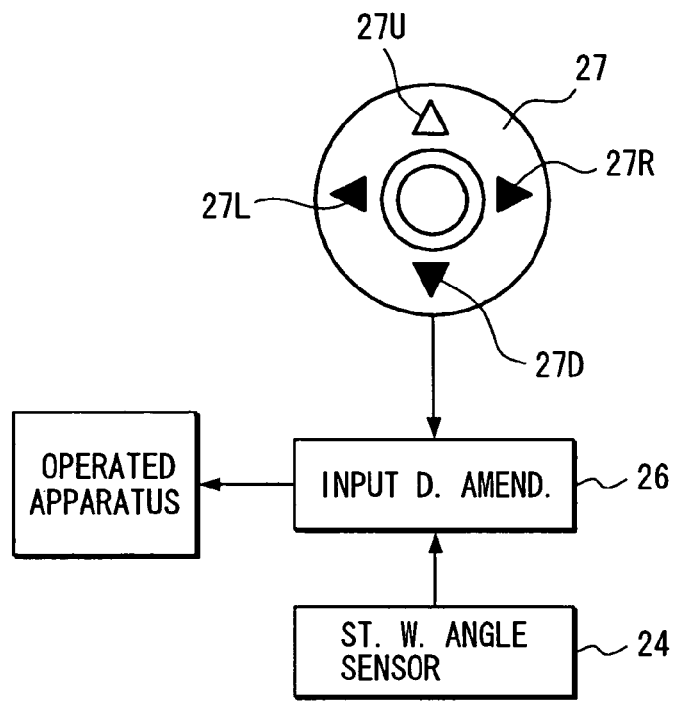
FIG. 14 is a diagram an electrical structure of a jog-dial, steering wheel angle sensor, and input direction amending unit.
FIG. 15 is an example of an operation menu based on an input direction of a jog-dial and a steering wheel angle.

As shown in FIG. 14, when the jog-dial 27 is operated for an input, its input direction is transmitted to the input direction amending unit 26. A steering wheel angle sensor 24 (as a steering wheel angle detecting unit) detects a steering wheel angle of the steering wheel 22 and transmits the detected steering wheel angle to the input direction amending unit 26. The input direction amending unit 26 causes the display apparatus 10 to display an operation menu or the air-conditioner to operate, based on the input direction of the jog-dial 27 and the detected steering wheel angle.

When a steering wheel angle is 0 degree, up, right, down, or left direction input is referred to 27U, 27R, 27D, or 27L, respectively. Association of input directions and steering wheel angles are stored as shown in FIG. 15. For instance, when a steering wheel angle is 0 to 29 degrees (ROW 1), a first association that input directions 27U, 27R, 27D, and 27L are associated with the operation menus M1, M2, M3, and M4, respectively is stored. When a steering wheel angle is 90±29 degrees (61 to 119 degrees) (ROW 2), a second association rotated by 90 degrees from the first association is stored.

When a steering wheel angle is 180±29 degrees (151 to 209 degrees) (ROW 3), a third association rotated by 180 degrees from the first association is stored. When a steering wheel angle is 270±29 degrees (241 to 299 degrees) (ROW 4), a fourth association rotated by 270 degrees from the first association is stored. Thus, when the input direction 27U, 27R, 27D, or 27L is inputted, a corresponding operation menu M1, M2, M3, or M4 is displayed on the display apparatus 10 based on the table in FIG. 15. Alternatively, inputting an input direction 27U, 27R, 27D, or 27L may directly cause the air-conditioner or the like to execute.

Figure 16:
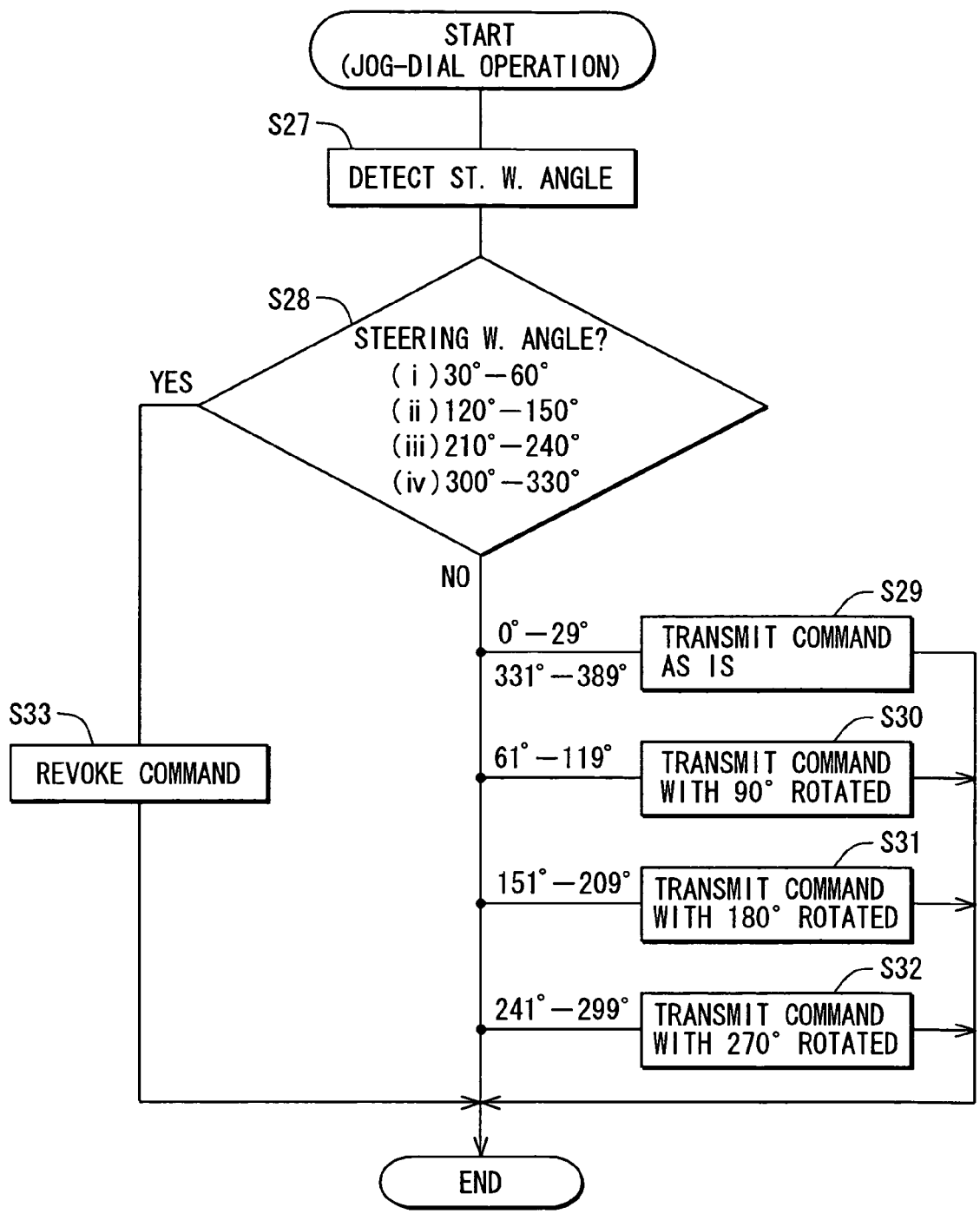
FIG. 16 is a flowchart diagram illustrating a process of an input direction amending unit.

A process of the input direction amending unit 26 is shown in a flowchart in FIG. 16. When a user operates the jog-dial for an input (Start), the steering wheel angle sensor 24 detects a steering wheel angle (Step S27). The input direction of the jog-dial 27 and the detected steering wheel angle are transmitted to the input direction amending unit 26. The input direction amending unit 26 determines whether the steering wheel angle is in any one angle range of 0 to 60 degrees, 120 to 150 degrees, 210 to 240 degrees, and 300 to 330 degrees. When this determination at Step S28 is negated, any one of Steps S29 to S32 is performed.

At Steps S29 to S32, a command is transmitted based on the input direction of the jog-dial 27 and the steering wheel angle. For instance, when a steering wheel angle is 0 to 29 degrees or 331 to 389 degrees, Step S29 is performed and a command corresponding to the input direction 27U, 27R, 27D, or 27L is transmitted as is (ROW 1). When 61 to 119 degrees, Step S30 is performed and a command corresponding to an input direction rotated by 90 degrees from the input direction 27U, 27R, 27D, or 27L is transmitted (ROW 2). When 151 to 209 degrees, Step S31 is performed and a command corresponding to an input direction rotated by 180 degrees from the input direction 27U, 27R, 27D, or 27L is transmitted (ROW 3). When 241 to 299 degrees, Step S32 is performed and a command corresponding to an input direction rotated by 270 degrees from the input direction 27U, 27R, 27D, or 27L is transmitted (ROW 4).

Thus, association of an input direction from a driver's viewpoint and an operation menu is maintained regardless of a steering wheel angle through amending of the input direction amending unit 26.

In contrast, when the determination at Step S28 is affirmed, a command is revoked at Step S33. As shown in FIG. 13B, when the jog-dial 27 is operated for an input at a steering wheel angle of about 45 degrees, it is difficult to determine which input direction the user inputs. This may cause a display of a wrong operation menu or mis-operation of an apparatus. Therefore, in this case, a command is revoked; no display of any operation menu or no operation of any apparatus is executed. In other words, when a steering wheel angle is in a predetermined angle range (0 to 29 degrees, 61 to 119 degrees, 151 to 209 degrees, 331 to 389 degrees), Steps S29 to S32 are performed, respectively to amend association of the input direction and an operation menu (or an operation item). In contrast, when a steering wheel angle is not in the predetermined angle range, Step S33 is performed to cause no display of an operation menu or no execution of an operation item.

Figure 17:
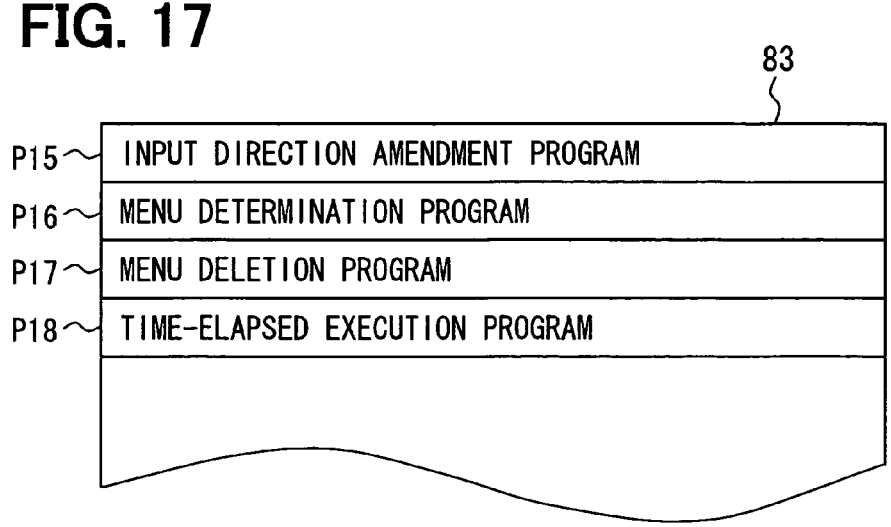
FIG. 17 is a diagram illustrating a storage area of a RAM.

As shown in FIG. 17, the RAM 83 stores an input direction amendment program P15, a menu determination program P16, a menu deletion program P17, and a time-elapsed execution program P18. The CPU 81 executes these programs to function as the input direction amending unit, menu determining unit, menu deleting unit, and time-elapsed executing unit, respectively. The menu determining unit, menu deleting unit, and time-elapsed executing unit will be explained later. The programs P16 to P18 are stored as part of the navigation program 19p in the HDD 19 and stored in the RAM 83 when the navigation program 19p is started.

Figure 18A:
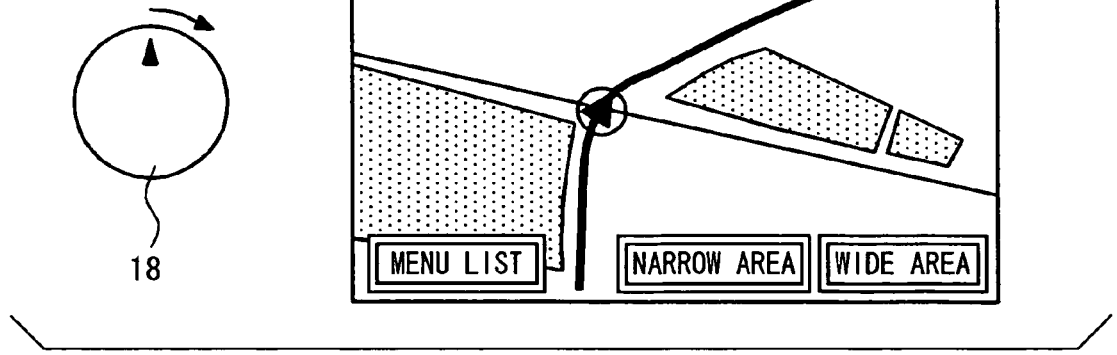
FIGS. 18A to 18C are examples including a menu deleting unit and menu determining unit.
Figure 18B:
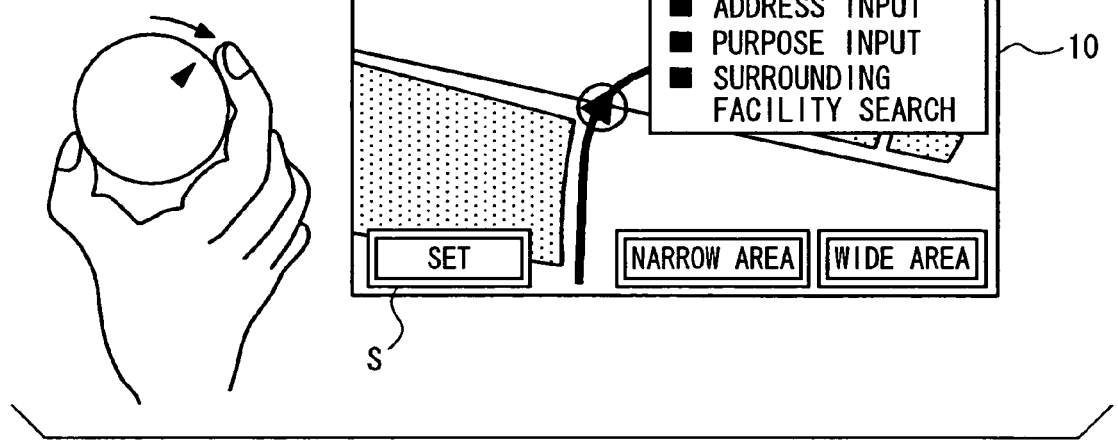
Figure 18C:
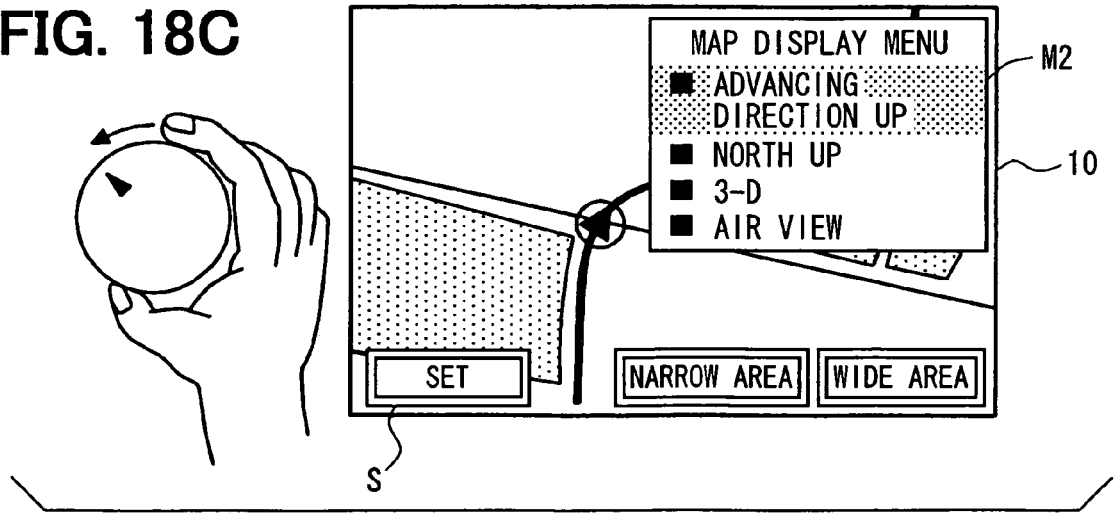

Next, yet another example is shown in FIGS. 18A to 18C. In this example, a rotary switch 18 is provided with a biasing portion (or biasing unit) such as a coil spring (not shown). When a user rotates the rotary switch 18 from an initial position, a force is applied to return the rotary switch 18 to the initial position. When the rotary switch 18 is rotated as shown in FIGS. 18B, 18C and then the user releases the rotary switch 18, the rotary switch 18 returns to the initial position shown in FIG. 18A. When the rotary switch 18 returns to the initial position, an operation menu is deleted and a background map becomes visible. (Here, the CPU 81 functions as the menu deleting unit.)

As shown in FIG. 18B, when the rotary switch 18 is rotated right, an operation menu M1 is displayed. When the rotary switch 18 is then rotated to the opposite direction, another menu is displayed as shown in FIG. 18C. When a given time period elapses after the operation menu M2 is displayed, the displayed operating menu M2 is determined and does not disappear with the rotary switch 18 released. (Here, the CPU 81 functions as the menu determining unit.) When the rotary switch 18 is thereafter rotated, a cursor C is replaced. When a set button S is then pressed or the rotary switch 18 itself is pressed with the cursor C placed in a specific operation item, the specific operation item is executed.

Figure 19:
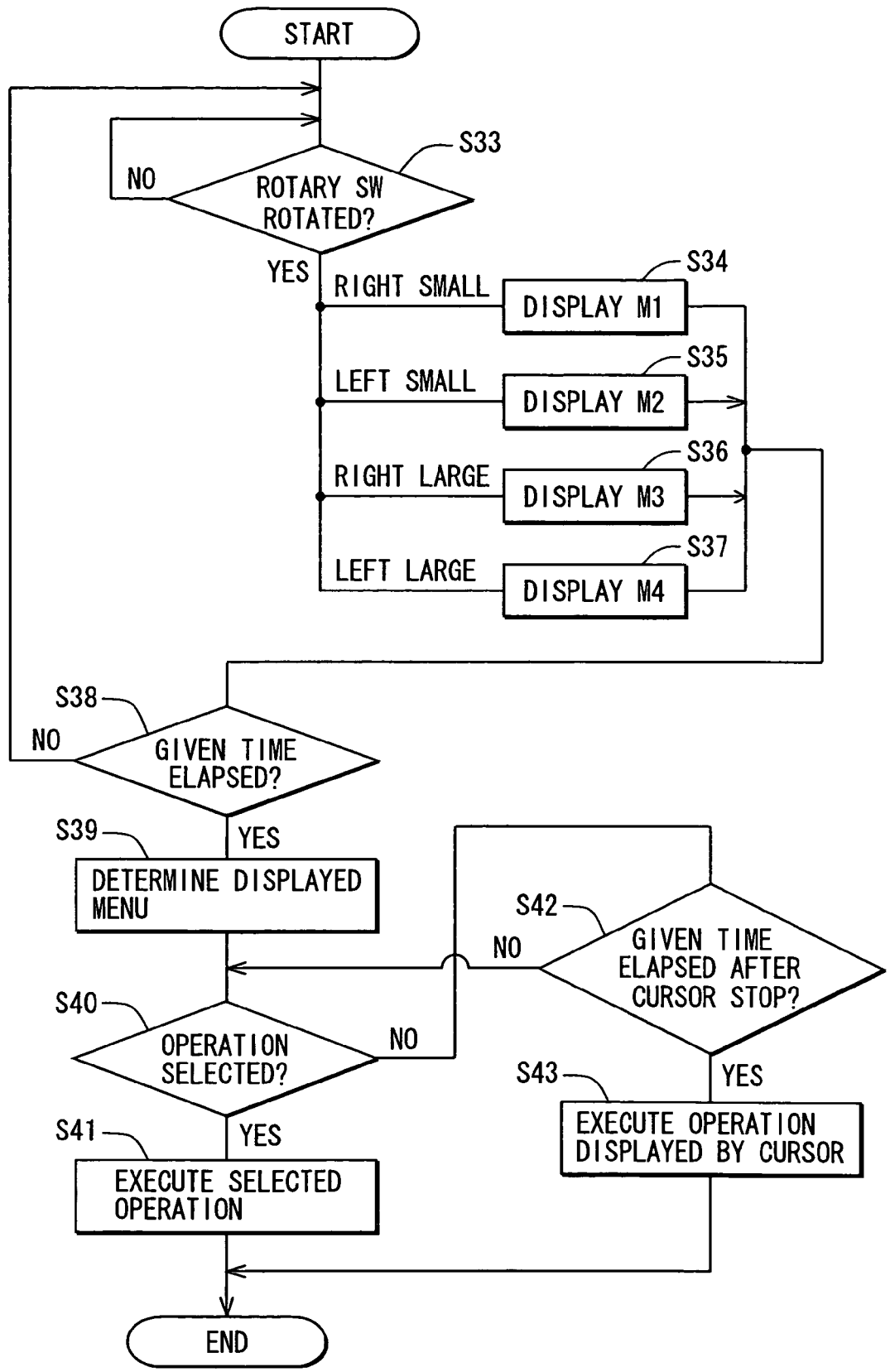
FIG. 19 is a flowchart diagram illustrating a process when a menu deleting unit and menu determining unit are included.

A flowchart is shown in FIG. 19. At Step S33, it is determined whether the rotary switch 18 is rotated. When the rotary switch 18 is rotated, Step S34 to S37 are individually performed. In this example, a small right-handed rotation corresponds to a display of an operation menu M1 (S34); a small left-handed rotation to a display of an operation menu M2 (S35); a large right-handed rotation corresponds to a display of an operation menu M3 (S36); and a large left-handed rotation to a display of an operation menu M4 (S37). Then, Step S38 is performed to determine whether a given time period (e.g., three seconds) elapses from when an operation menu is displayed. When this determination at Step S38 is negated, Step S33 and a subsequent step are repeated. In contrast, when the determination at Step S38 is affirmed, the displayed operation menu is determined at Step S39. (Here, the CPU 81 functions as the menu determining unit.)

Step S40 is then performed to determine whether the user selects one of the operation items in the determined operation menu. For instance, when the set button S or rotary switch 18 itself is pressed, the determination at Step S40 is affirmed. Step S41 is then performed to execute the selected operation item. When the determination at Step S40 is negated, Step S42 is performed to determine whether a given time period elapses from when a cursor C is stopped at a specific operation item. (Here, the CPU 81 functions as the time-elapsed executing unit.) When this determination at Step S42 is affirmed, the specific operation item is executed; when negated, Step S40 is repeated. An intended operation item can be executed without the set button S or rotary switch 18 pressed, which enhances user-friendliness.

Figure 20:
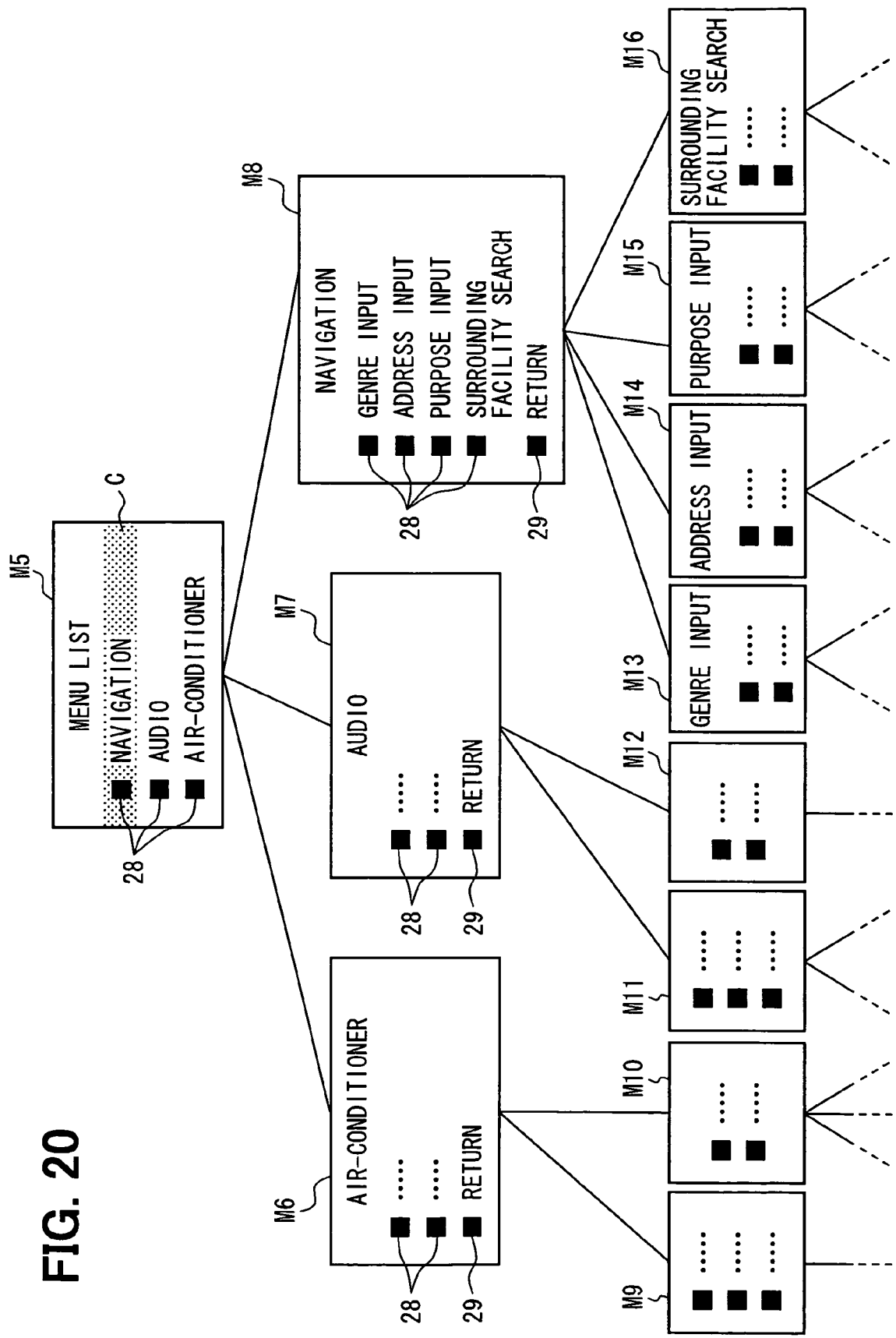
FIG. 20 is a diagram illustrating a hierarchical structure of operation menus.

Next, an example of displaying operation menus will be explained with reference to FIG. 20, where several operation menus are provided under a hierarchical structure having several layers. The highest-layer operation menu M5 is followed by lower-layer menus M6 to M8, which are further followed by lower-layer menus M9 to M16. When a user operates an input operation apparatus such as the rotary switch 18, the highest-layer operation menu M5 is displayed. In the operation menu M5, a lower-layer menu display portion 28 is included. The user rotates the rotary switch 18 to place a cursor C to any one of three lower-layer menu display portions 28. When the rotary switch 18 or set button S is pressed with the cursor C placed, the corresponding lower-layer operation menu M6, M7, M8 is displayed. In this example, the user can select one of "navigation," "audio," and "air-conditioner" via the operation menu M5.

Each of the lower-layer operation menus M6 to M8 includes lower-layer menu display portions 28. For instance, an operation menu M8 for operating a navigation apparatus includes "genre input," "address input," "purpose input," and "surrounding facility search." When any one of these lower-layer menu display portions 28 is selected by the user, a corresponding one of the lower-layer menus M13 to M16 is displayed. Furthermore, the operation menu M8 further includes a higher-layer menu display portion 29 (RETURN). When the higher-layer menu display portion 29 is selected, an operation menu higher by one layer is displayed.

Thus, a user can select an intended lower-layer operation menu from a higher-layer operation menu in order to display. When a procedure is mistaken, a higher-layer operation menu can be displayed again by selecting a higher-layer menu display portion 29. Since the input operation apparatus is easy to handle, the above procedures can be simply executed.

Furthermore, under the above structure, an operation menu more frequently used can be placed in a higher layer, whereas an operation menu less frequently used can be placed in a lower layer. A user selects a lower-layer menu display portion 28 when a higher-layer operation menu is displayed, which allows a lower-layer operation menu less frequently used to be called up and displayed in order. In contrast, when an intended lower-layer operation menu is not found, a higher-layer menu display portion 29 is selected to return to a higher-layer operation menu.

Furthermore, an apparatus operating system can use the above hierarchical structure. For instance, operations or manipulations of the rotary switch 18 defined by using a rotation direction and/or a rotation angle are respectively associated with operation menus M6, M7, M8 of the second highest layer. When the rotary switch 18 is operated to meet a given operation when the highest-layer operation menu M5 is not displayed, one of the operation menus M6, M7, M8 associated with the given operation can be directly displayed with bypassing a display of the operation menu M5.

Furthermore, for instance, a certain operation menu (e.g., M16) of the third highest layer may be associated with a certain operation of the rotary switch 18, as needed. In this case, when the rotary switch 18 is operated to meet the certain operation when no operation menus M5 to M8 of the first and second highest layers are displayed, the certain operation menu (e.g., M16) may be directly displayed without displaying the operation menus M5 to M8. Yet furthermore, in this case, it can be also designed that the certain operation menu (e.g., M16) may be directly displayed when the rotary switch 18 is operated to meet the certain operation regardless of whether any upper layer operation menu M5 to M8 is displayed or not.

The above embodiment or examples are explained using a navigation apparatus in a vehicle; however, not limited to the navigation apparatus, an apparatus operating system can be adapted to another system or apparatus such as an electric appliance, a hand-held terminal, or a personal computer. For instance, in an electric appliance, several operation menus stored can be displayed on a display unit of the electric appliance.

Individual steps or execution explained in the above embodiment or examples, e.g., using a flowchart may be constructed as a unit or means in a program stored in the RAM, HDD, or the like and executed by using the CPU or the like.

It will be obvious to those skilled in the art that various changes may be made in the above-described embodiments of the present invention. However, the scope of the present invention should be determined by the following claims.

What is claimed is:

1. An apparatus operating system comprising:
   an operation menu storage unit for storing a plurality of operation menus, each operation menu including a plurality of operation items as a list to operate a given apparatus;
   a display unit for displaying each operation menu; and
   an input operation apparatus enabled to input at least one of an operation direction and an operation amount, wherein
   when a first operation is applied to the input operation apparatus with no operation menu displayed, one of the operation menus that is previously associated with the first operation is displayed by the display unit, and
   when a second operation is applied to the input operation apparatus with one of the operation menus displayed, an intended operation item included in the one of the operation menus is selectable based on the second operation,
   the input operation apparatus is a rotary switch to which a rotation operation is applied and which is enabled to input at least one of a rotation direction being the operation direction and a rotation angle being the operation amount,
   further comprising:
   a biasing unit for biasing the rotary switch to return to an initial position when a rotation operation is applied to the rotary switch; and
   a menu deleting unit for deleting an operation menu, which is displayed when the rotation operation is applied, when the rotary switch returns to the initial position by the biasing unit after the rotation operation is released.

2. The apparatus operating system of claim 1, wherein
   the input operation apparatus is configured to be manipulated to cause the first operation and the second operation to be serially performed to provide both the operation direction and the operation amount, and
   the operation direction is provided by the first operation whereas the operation amount is provided by the second operation.

3. The apparatus operating system of claim 1, further comprising:
   an active state determining unit for determining which of an active state and a non-active state takes place, wherein one of the operation menus is displayed in the active state unit, wherein no operation menu is displayed in the non-active state;
   a specific operation menu calling unit for
      determining an exceptional procedure in a menu calling mode when the first operation is applied to the input operation apparatus with the non-active state taking place, and then
      calling up a specific operation menu from the operation menu storage unit, wherein the specific operation menu is previously associated with the at least one of the operation direction and the operation amount of the first operation to cause the display unit to display the specific operation menu;
   a replacement displaying unit for causing an intended operation item, which is included in one of the operation menus that is displayed, to be selectable based on the second operation when the second operation is applied to the input operation apparatus with the active state taking place; and
   a normal operation controlling unit for determining a normal procedure in a normal operation mode when an operation item is selected from the plurality of operation items included in the one of the operation menus that is displayed, and executing the selected operation item.

4. The apparatus operating system of claim 3, wherein the plurality of operation menus are combined under a higher-layer menu, and the specific operation menu calling unit directly calls up the specific operation menu while bypassing the higher-layer menu when the first operation is applied to the input operation apparatus with no operation menu displayed.

5. The apparatus operating system of claim 1, further comprising:

a direct operation executing unit for directly executing a specific operation item, which is previously associated with at least one of an operation direction and an operation amount of a third operation, without displaying an operation menu including the specific operation item when the third operation is applied to the input operation apparatus with no operation menu displayed.

6. The apparatus operating system of claim 1, wherein the rotary switch detects a pressing operation, and an operation item is executed when the pressing operation is detected by the rotary switch when the operation item is selectable in one of the operation menus that is displayed.

7. The apparatus operating system of claim 1, wherein the input operation apparatus is a joy-stick to which a tilt operation is applied to, the joy-stick includes an operation lever enabled to tilt to a tilt direction being the operation direction of the tilt operation and a direction detecting unit for detecting the tilt direction to which the operation lever is tilted, and the joy-stick is enabled to input the tilt direction through the tilt operation.

8. The apparatus operating system of claim 1, further comprising:

a steering wheel angle detecting unit for detecting a steering wheel angle of a steering wheel to which the input operation apparatus is attached to, wherein the input operation apparatus is rotated as the steering wheel rotates, wherein the input operation apparatus is enabled to input one of a plurality of first operation directions relative to the input operation apparatus, wherein a first association where each first operation direction is associated with an operation menu is predetermined; and an input direction amending unit for amending the first association by amending the first operation direction to a direction, which is viewed from a user seated on a driver seat independently of the steering wheel angle, based on the detected steering wheel angle, and causing the display unit to display an operation menu associated with the direction viewed from the user.

9. The apparatus operating system of claim 8, wherein the input direction amending unit amends the first association when the detected steering wheel angle is within a predetermined range of steering wheel angles, and the input direction amending unit does not amend the first association when the detected steering wheel angle is not within the predetermined range of steering wheel angles.

10. The apparatus operating system of claim 1, further comprising:

a menu determining unit for determining the one of the operation menus, which is associated with the first operation, when a given time period elapses from when the one of the operation menus is displayed by the display unit and causing the display unit to display one of the operation menus that is associated with a third operation, the third operation being subsequently applied to the input operation apparatus before the given time period elapses from when the one of the operation menus associated with the first operation is displayed.

11. The apparatus operating system of claim 1, further comprising:

a time-elapsed executing unit for executing the intended operation item, which is selectable in the one of the operation menus that is displayed, when a given time period elapses from when the intended operation item becomes selectable based on the second operation.

12. The apparatus operating system of claim 1, wherein the plurality of operation menus are included in a hierarchical structure having a plurality of layers, a certain operation menu of the plurality of operation menus includes a higher-layer menu display portion for displaying a higher-layer operation menu that is one layer higher than a layer of the certain operation menu, and a lower-layer menu display portion for displaying a lower-layer operation menu that is one layer lower than the layer of the certain operation menu, and an operation menu that is displayed and that is switched between adjacent layers of the plurality of layers by selecting the higher-layer menu display portion or the lower-layer menu display portion.

13. An apparatus operating system comprising:

an operation menu storage unit for storing a plurality of operation menus, each operation menu including a plurality of operation items as a list to operate a given apparatus;

a display unit for displaying each operation menu; and an input operation apparatus enabled to input at least one of an operation direction and an operation amount, wherein when a first operation is applied to the input operation apparatus with no operation menu displayed, one of the operation menus that is previously associated with the first operation is displayed by the display unit, and when a second operation is applied to the input operation apparatus with one of the operation menus displayed, an intended operation item included in the one of the operation menus is selectable based on the second operation, further comprising:

a direct operation executing unit for directly executing a specific operation item, which is previously associated with at least one of an operation direction and an operation amount of a third operation, without displaying an operation menu including the specific operation item when the third operation is applied to the input operation apparatus with no operation menu displayed;

a steering wheel angle detecting unit for detecting a steering wheel angle of a steering wheel to which the input operation apparatus is attached to, wherein the input operation apparatus is rotated as the steering wheel rotates, wherein the input operation apparatus is enabled to input one of a plurality of first operation directions relative to the input operation apparatus, wherein a second association where each first operation direction is associated with an operation item is predetermined; and an input direction amending unit for amending the second association by amending the first operation direction to a direction, which is viewed from a user seated on a driver seat independently of the steering wheel angle, based on the detected steering wheel angle, and causing the direct operation executing unit directly executes a specific operation item associated with the direction viewed from the user.

14. The apparatus operating system of claim 13, wherein the input direction amending unit amends the second association when the detected steering wheel angle is within a predetermined range of steering wheel angles, and the input direction amending unit does not amend the second association when the detected steering wheel angle is not within the predetermined range of steering wheel angles.

15. An apparatus operating system comprising:

an operation menu storage unit for storing a plurality of operation menus, each operation menu including a plurality of operation items as a list to operate a given apparatus;

a display unit for displaying each operation menu;

an input operation apparatus enabled to input at least one of an operation direction and an operation amount, the input operation apparatus being a rotary switch to which a rotation operation is applied, the operation direction being a rotation direction, and the operation amount being a rotation angle, wherein when a first operation is applied to the input operation apparatus with no operation menu displayed, one of the operation menus that is previously associated with the first operation is displayed by the display unit, and when a second operation is applied to the input operation apparatus with one of the operation menus displayed, an intended operation item included in the one of the operation menus is selectable based on the second operation; and a menu determining unit for determining the one of the operation menus, which is associated with the first operation, when a given time period elapses from when the one of the operation menus is displayed by the display unit and causing the display unit to display one of the operation menus that is associated with a third operation subsequently applied to the input operation apparatus before the given time period elapses from when the one of the operation menus associated with the first operation is displayed.

* * * * *